(12) United States Patent
Thomas et al.

(10) Patent No.: US 10,097,479 B1
(45) Date of Patent: *Oct. 9, 2018

(54) METHODS AND APPARATUS FOR RANDOMLY DISTRIBUTING TRAFFIC IN A MULTI-PATH SWITCH FABRIC

(71) Applicant: Juniper Networks, Inc., Sunnyvale, CA (US)

(72) Inventors: Philip A. Thomas, San Jose, CA (US); Sarin Thomas, Sunnyvale, CA (US); Jean-Marc Frailong, Los Altos Hills, CA (US); Pradeep Sindhu, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/087,642

(22) Filed: Mar. 31, 2016

Related U.S. Application Data

(63) Continuation of application No. 13/433,960, filed on Mar. 29, 2012, now Pat. No. 9,331,929.

(51) Int. Cl.
| | |
|---|---|
| *H04L 12/947* | (2013.01) |
| *H04L 12/707* | (2013.01) |
| *H04L 12/935* | (2013.01) |

(52) U.S. Cl.
CPC .............. *H04L 49/25* (2013.01); *H04L 45/24* (2013.01); *H04L 49/30* (2013.01)

(58) Field of Classification Search
CPC ......... H04L 12/28; H04L 47/50; H04L 49/30; H04L 49/3018; H04L 49/3027;
(Continued)

(56) References Cited

U.S. PATENT DOCUMENTS

| | | |
|---|---|---|
| 7,061,927 B2 | 6/2006 | Panigrahy et al. |
| 7,072,348 B2 | 7/2006 | Frank |

(Continued)

OTHER PUBLICATIONS

Jung et al., "Banyan Multipath Self-Routing ATM Switches with Shared Buffer Type Switch Elements," IEEE Transactions on Communications, vol. 43, No. 11, Nov. 1995, pp. 2847-2857.

(Continued)

*Primary Examiner* — Phong La
(74) *Attorney, Agent, or Firm* — Cooley LLP

(57) ABSTRACT

In some embodiments, an apparatus comprises a schedule module within a switch fabric system. At a first time, the schedule module is configured to access a list of status indicators associated with a group of egress port indicators. The list of status indicators includes a set of status indicators each of which has a value greater than a threshold. The schedule module is configured to randomly select a status indicator from the set of status indicators and configured to reduce the value of the selected status indicator. The schedule module is then configured to send the egress port indicator associated with the selected status indicator such that a data cell is sent from an egress port associated with that egress port indicator. At a second time, when the value of every status indicator from the list of status indicators is not greater than the threshold, the schedule module is configured to increase the value of every status indicator above the threshold.

16 Claims, 8 Drawing Sheets

(58) Field of Classification Search
CPC ......... H04L 47/10; H04L 47/39; H04L 49/90; H04L 67/1067
See application file for complete search history.

(56) References Cited

U.S. PATENT DOCUMENTS

| | | | |
|---|---|---|---|
| 7,339,935 | B2 | 3/2008 | Yasukawa et al. |
| 7,697,432 | B2 | 4/2010 | Yu et al. |
| 7,724,760 | B2 | 5/2010 | Balakrishnan et al. |
| 7,843,906 | B1 | 11/2010 | Chidambaram et al. |
| 8,724,628 | B1 | 5/2014 | Aybay |
| 8,730,954 | B2 | 5/2014 | Sindhu et al. |
| 8,804,710 | B2 | 8/2014 | Aybay et al. |
| 2002/0064170 | A1* | 5/2002 | Siu .................... H04L 12/5601 370/412 |
| 2002/0075883 | A1 | 6/2002 | Dell et al. |
| 2004/0090974 | A1* | 5/2004 | Balakrishnan .......... H04L 47/10 370/412 |
| 2004/0264374 | A1 | 12/2004 | Yu et al. |
| 2005/0053096 | A1 | 3/2005 | Yasukawa et al. |
| 2005/0060414 | A1 | 3/2005 | Phillips et al. |
| 2006/0165112 | A1 | 7/2006 | Varma |
| 2009/0003212 | A1 | 1/2009 | Kwan et al. |
| 2009/0201811 | A1 | 8/2009 | Filsfils et al. |
| 2010/0014428 | A1* | 1/2010 | Naven ................. H04L 49/3018 370/237 |
| 2012/0020210 | A1 | 1/2012 | Sonnier et al. |

OTHER PUBLICATIONS

Kompella et al., "The Use of Entropy Labels in MPLS Forwarding," Mar. 6, 2011, 25 pgs.

Mir, "An Efficient Switching System for Next-Generation Large-Scale Computer Networking," San Jose State University, Dept. of Electrical Eng., IEEE 0-7803-7510-6/02, ICCS 2002, pp. 1130-1134.

Raiciu "Data Center Networking with Multipath TCP," Slideshow, University College London & Universitatea Politehnica Bucuresti, [online] [retrieved Jan. 2011] Retrieved from the Internet: <URL: http://www.ietf.org/proceedings/79/slides/mptcp-6.ppt>, 28 pgs.

Shukla, "Methods and Apparatus for Improving Load Balancing in Overlay Networks," U.S. Appl. No. 13/225,137, filed Sep. 2, 2011, 41 pgs.

Xia et al. "Multiple-Choice Random Network for Server Load Balancing," [online] Retrieved from the Internet: <URL: http://www.cise.ufl.edu/~adobra/Publications/PID343192.pdf>, INFOCOM 2007, 26th International Conference on Computer Communications, IEEE, 9 pgs.

* cited by examiner

METHODS AND APPARATUS FOR RANDOMLY DISTRIBUTING TRAFFIC IN A MULTI-PATH SWITCH FABRIC

CROSS-REFERENCES TO RELATED APPLICATIONS

This application is a continuation of U.S. application Ser. No. 13/433,960 filed Mar. 29, 2012, (now U.S. Pat. No. 9,331,929), entitled "METHODS AND APPARATUS FOR RANDOMLY DISTRIBUTING TRAFFIC IN A MULTI-PATH SWITCH FABRIC," which is incorporated herein by reference in its entirety.

BACKGROUND

Some embodiments described herein relate generally to switch fabric systems, and, in particular, to methods and apparatus for randomly distributing traffic within a multi-path switch fabric system.

Some known switch fabric systems use a round-robin algorithm (RR) to distribute traffic over available data paths, where a round-robin pointer is used to select an egress port from a list of egress ports in a switch device for sending a data item. Alternatively, a deficit-weighted round-robin algorithm (DWRR) is used in other embodiments where each egress port and/or each data item is associated with a weighted credit. To implement RR or DWRR, destination devices are usually grouped, with each group maintaining its own RR or DWRR state consisting of a set of available egress ports and a round-robin pointer. Because each group maintains its own round-robin pointer, however, several groups' pointers can possibly become aligned and advance in lock-step, as long as a particular traffic pattern repeats. This leads to instantaneous queue build-up at a single egress port within a switch device. Furthermore, even if only a single group is present per switch device, the fact that multiple switch devices are at one stage of a switch fabric can produce lock-stepped pointers in a similar way, which can lead to queue build-up in the immediately following stage.

Accordingly, a need exists for a path-selection algorithm that can prevent correlated behavior such as lock-stepped pointers within, and across switch devices, in a multi-path switch fabric system.

SUMMARY

In some embodiments, an apparatus comprises a schedule module within a switch fabric system. At a first time, the schedule module is configured to access a list of status indicators associated with a group of egress port indicators. The list of status indicators includes a set of status indicators each of which has a value greater than a threshold. The schedule module is configured to randomly select a status indicator from the set of status indicators and configured to reduce the value of the selected status indicator. The schedule module is then configured to send the egress port indicator associated with the selected status indicator such that a data cell is sent from an egress port associated with that egress port indicator. At a second time, when the value of every status indicator from the list of status indicators is not greater than the threshold, the schedule module is configured to increase the value of every status indicator above the threshold.

DETAILED DESCRIPTION

Figure 1:
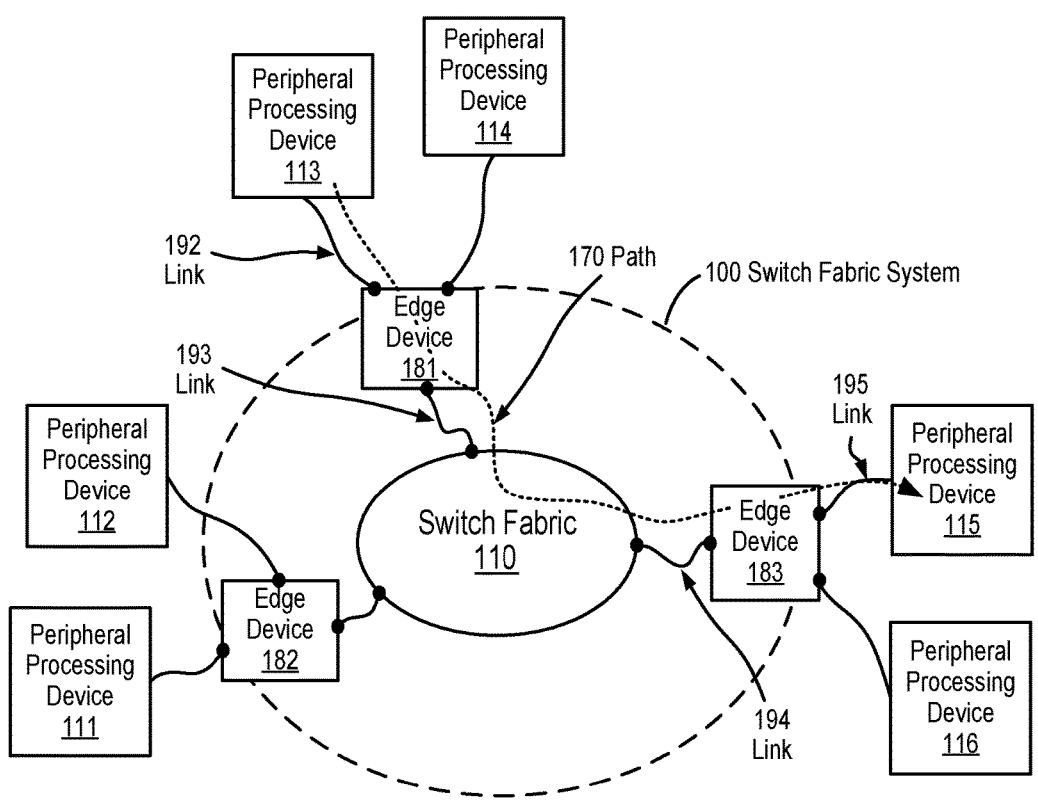
FIG. 1 is a system block diagram of a switch fabric system configured to forward data items, according to an embodiment.

In some embodiments, a switch fabric includes a schedule module configured to be operatively coupled to a switch module. The switch module is configured to receive a data cell having a destination identifier, which is uniquely associated with a list of status indicators. Each status indicator from the list of status indicators is associated an egress port indicator, which uniquely identifies an egress port of the switch module. Each status indicator from the list of status indicators has a value. In some embodiments, each status indicator has a first value or a second value, where the first value is greater than a threshold and the second value is not greater than the threshold. In some embodiments, the second value is equivalent to the threshold. The schedule module is configured to access the list of status indicators, and randomly select a status indicator from a set of status indicators each of which has a value greater than the threshold (e.g., the first value). After a status indicator is selected, the schedule module is configured to reduce the value of the selected status indicator, for example, from the first value to the second value. When the value of every status indicator from the list of status indicators is not greater than the threshold (e.g., the second value), the schedule module is configured to increase the value of every status indicator from the list of status indicators above the threshold, for example, from the second value to the first value. Finally, the schedule module is configured to send the egress port indicator associated with the selected status indicator to the switch module, such that the received data cell is sent from an egress port of the switch module that is associated with that egress port indicator.

In some embodiments, each status indicator from the list of status indicators is associated with a credit value. In some embodiments, the credit value is the same for all status indicators from the list of status indicators. In some other embodiments, the credit value for a status indicator is different from the credit value for another status indicator. The schedule module is configured to randomly select a status indicator based on the credit value for each status indicator from the set of status indicators. After a status indicator is selected, the schedule module is configured to reduce the credit value of the selected status indicator. When the value of every status indicator from the list of status indicators is decreased below the threshold by the schedule module, the schedule module is also configured to increase the credit value for each status indicator from the list of status indicators.

In some embodiments, a schedule module is configured to randomly select an egress port indicator from a list of egress port indicators of a switch module based on a credit value associated with each egress port indicator from the list of egress port indicators. The schedule module is configured to send the selected egress port indicator to the switch module such that a data cell received at the switch module is sent from an egress port of the switch module associated with the selected egress port indicator.

In some embodiments, a multi-stage switch fabric includes a set of first stage switch modules, a set of second stage switch modules and a set of third stage switch modules. In some embodiments, the multi-stage switch fabric also includes multiple schedule modules, where each first stage switch module is operatively coupled to a unique schedule module. Alternatively, multiple first stage switch modules can be operatively coupled to one switch module. In such a multi-stage switch fabric, one or more switch modules (e.g., first stage switch modules, second stage switch modules) are configured to receive one or more data cells. The schedule module(s) operatively coupled to the switch modules are configured to randomly select an egress port indicator from a list of egress port indicators associated with the switch modules. The switch modules are configured to send the data cells from the egress ports associated with the selected egress port indicators.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated L2/L3 switch). Portions of the switch fabric can be physically distributed across, for example, many chassis and/or modules interconnected by multiple physical hops. In some embodiments, for example, a stage of the switch fabric can be included in a first chassis and another stage of the switch fabric can be included in a second chassis. Both of the stages can logically function as part of a single consolidated switch (e.g., within the same logical hop according to a first protocol) but include a separate single physical hop between respective pairs of stages within the consolidated switch. Similarly stated, a physical hop can operatively couple each stage within a switch fabric representing a single logical hop associated with a protocol used to route data outside the switch fabric. Additionally, packet classification and forwarding associated with a protocol used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used herein, a switch module that is within a switch fabric can be, for example, any assembly and/or set of operatively-coupled electrical components that define one or more switches within a stage of a switch fabric. In some embodiments, a switch module can include, for example, a memory, a processor, electrical traces, optical connectors, software (executing in hardware) and/or the like.

As used in this specification, the singular forms "a," "an" and "the" include plural referents unless the context clearly dictates otherwise. Thus, for example, the term "a switch fabric" is intended to mean a single switch fabric or a combination of switch fabrics.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the "third stage" (the third and final stage with respect to the ingress to egress direction). For example, FIG. 2 refers to specific stages within a given multi-stage switch fabric. In other instances, however, the terms "first stage", "second stage" and so on refer to any stage within the switch fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the first stage within the three-stage Clos network). Thus, it should be understood that the specific context will indicate whether the terms "first stage", "second stage" and so on can refer to a specific ordinal stage within a switch fabric or can refer to any particular stage within the switch fabric.

As used herein, the term "egress port indicator" can refer to an indicator or identifier of an egress port (e.g., a port number). An "egress port indicator list" can refer to a list of egress port indicators, for example, available for routing or switching cells having a particular destination-related indicator such as a particular destination indicator or group indicator for a set of cells, as discussed further below. An "egress port indicator set" can refer to a subset of the egress port indicator list and can refer to the egress port indicators eligible for scheduling, for example, those egress ports that have not yet been scheduled or have a credit value above a threshold.

Each egress port indicator is associated with a "status indicator," which indicates whether the associated egress port is eligible for scheduling. For example, a status indicator having a value of "1" can indicator that the associated egress port is eligible for scheduling; a status indicator having a value of "0" can indicator that the associated egress port is not eligible for scheduling. A "status indicator list" can refer to a list of status indicators associated with the egress port indicators in an egress port indicator list. Similarly, a "status indicator set" can refer to a list of status indicators associated with the egress port indicators in an egress port indicator set (eligible for scheduling).

FIG. 1 is a schematic diagram that illustrates a switch fabric system 100 configured to forward data items (e.g., data packets, data cells), according to an embodiment. The switch fabric system 100 includes a switch fabric 110 and multiple edge devices (e.g., edge devices 181-183). The switch fabric system 100 operatively couples multiple peripheral processing devices (e.g., peripheral processing devices 111-116) to each other. The peripheral processing devices 111-116 can be, for example, compute nodes, service nodes, routers, and storage nodes, etc. In some embodiments, for example, the peripheral processing devices 111-116 include servers, storage devices, gateways, workstations, and/or the like.

The peripheral processing devices 111-116 can be operatively coupled to the edge devices 181-183 of the switch fabric system 100 using any suitable connection such as, for example, an optical connection (e.g., an optical cable and optical connectors), an electrical connection (e.g., an electrical cable and electrical connectors) and/or the like. As such, the peripheral processing devices 111-116 are configured to send data (e.g., data packets) to the switch fabric system 100 via the edge devices 181-183. In some embodiments, the connection between the peripheral processing devices 111-116 and the edge devices 181-183 is a direct link. Such a link can be said to be a single physical hop link. In other embodiments, the peripheral processing devices can be operatively coupled to the edge devices via intermediate modules. Such a connection can be said to be a multiple physical hop link.

Each edge device 181, 182, 183 can be any device configured to operatively couple peripheral processing devices 111-116 to the switch fabric 110. In some embodiments, for example, the edge devices 181-183 can be access switches, input/output modules, top-of-rack devices and/or the like. Structurally, the edge devices 181-183 can function as both source edge devices and destination edge devices. Accordingly, the edge devices 181-183 can send data (e.g., a data stream of data cells) to and receive data from the switch fabric 110, and to and from the connected peripheral processing devices 111-116.

In some embodiments, the edge devices 181-183 can be a combination of hardware modules and software modules (executing in hardware). In some embodiments, for example, each edge device 181, 182, 183 can include a field-programmable gate array (FPGA), an application specific integrated circuit (ASIC), a digital signal processor (DSP) and/or the like.

The edge devices 181-183 can be configured to prepare a data packet (e.g., an Ethernet packet) to enter the switch fabric 110. In some embodiments, the edge devices 181-183 can be configured to disassemble a data packet into multiple data cells, and then send each of the data cells to the switch fabric 110. Specifically, after receiving a data packet from a peripheral processing device (e.g., peripheral processing device 111-116) operatively coupled to an edge device (e.g., the edge device 181-183), the edge device is configured to disassemble the data packet into multiple data cells prior to sending each of the data cells to the switch fabric 110. In some embodiments, the data cells sent from the edge device have the same size (e.g., in bytes, in bits). In some embodiments, the data cells disassembled from a data packet have a common source identifier (e.g., a source MAC address, a source IP address, etc.) which identifies a source device of the data packet, and a common destination identifier (e.g., a destination MAC address, a destination IP address, etc.) which identifies a destination device of the data packet. Similarly, in some embodiments, the edge devices 181-183 can be configured to reassemble multiple data cells into a data packet, and then send the reassembled data packet to a peripheral processing device (e.g., peripheral processing device 111-116). Specifically, after receiving all the data cells that are disassembled from a data packet from the switch fabric 110, an edge device is configured to reassemble the data cells back into a data packet that is identical to the original data packet prior to sending the reassembled data packet to the destined peripheral processing device. In such embodiments, the data cells disassembled from a data packet are sent to the same edge device (e.g., edge device 183) such that the data cells can be reassembled into the data packet at the edge device.

Each of the edge devices 181-183 is configured to communicate with the other edge devices 181-183 via the switch fabric 110. Specifically, the switch fabric 110 is configured to provide any-to-any connectivity between the edge devices 181-183 at relatively low latency. For example, switch fabric 110 can be configured to transmit (e.g., convey) data between edge devices 181-183. In some embodiments, the switch fabric 110 can have at least hundreds or thousands of ports (e.g., egress ports and/or ingress ports) through which edge devices 181-183 can transmit and/or receive data. As described in further detail herein, each edge device 181, 182, 183 can be configured to communicate with the other edge devices 181, 182, 183 over multiple data paths. More specifically, in some embodiments, multiple data paths exist, within the switch fabric 110, between a first edge device and a second edge device.

The edge devices 181-183 can include one or more network interface devices (e.g., a 40 Gigabit (Gb) Ethernet interface, a 100 Gb Ethernet interface, etc.) through which the edge devices 181-183 can send signals to and/or receive signals from the switch fabric 110. The signals can be sent to and/or received from the switch fabric 110 via an electrical link, an optical link and/or a wireless link operatively coupled to the edge devices 181-183. In some embodiments, the edge devices 181-183 can be configured to send signals to and/or receive signals from the switch fabric 110 based on one or more protocols (e.g., an Ethernet protocol, a multi-protocol label switching (MPLS) protocol, a Fibre Channel protocol, a Fibre-Channel-over Ethernet protocol, an Infiniband-related protocol, a cell-based protocol, etc.).

The switch fabric 110 can be any suitable switch fabric that operatively couples the edge devices 181-183 to the other edge devices 181-183 via multiple data paths. In some embodiments, for example, the switch fabric 110 can be a Clos network (e.g., a non-blocking Clos network, a strict sense non-blocking Clos network, a Benes network) having multiple stages of switch modules (e.g., integrated Ethernet switches). In some embodiments, for example, the switch fabric 110 can be similar to the switch fabric 200 shown in FIG. 2 and described in further detail herein, which has three stages. In other embodiments, the switch fabric 110 shown in FIG. 1 can include any number of stages. In such embodiments, for example, the switch fabric 110 can include five, seven or nine stages. The switch fabric 110 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the switch fabric 110 can be (e.g., can function as) a single consolidated switch (e.g., a single large-scale consolidated L2/L3 switch). In other words, the switch fabric 110 can be configured to operate as a single logical entity (e.g., a single logical network element). Similarly stated, the switch fabric 110 can be part of a single logical hop between a first edge device 181, 182, 183 and a second edge device 181, 182, 183 (e.g., along with the data paths between the edge devices 181-183 and the switch fabric 110). The switch fabric 110 can be configured to connect (e.g., facilitate communication between) the peripheral processing devices 111-116. In some embodiments, the switch fabric 110 can be configured to communicate via interface devices (not shown) that are configured to transmit data at a rate of at least 10 Gb/s. In some embodiments, the switch fabric 110 can be configured to communicate via interface devices (e.g., fibre-channel interface devices) that are configured to transmit data at a rate of, for example, 2 Gb/s, 4 Gb/s, 8 Gb/s, 10 Gb/s, 40 Gb/s, 100 Gb/s and/or faster link speeds.

Although the switch fabric 110 can be logically centralized, the implementation of the switch fabric 110 can be highly distributed, for example, for reliability. For example, portions of the switch fabric 110 can be physically distributed across, for example, many chassis. In some embodiments, for example, a stage of the switch fabric 110 can be included in a first chassis and another stage of the switch fabric 110 can be included in a second chassis. Both of the stages can logically function as part of a single consolidated switch (e.g., within the same logical hop) but have a separate single physical hop between respective pairs of stages. More details related to architecture of a switch fabric are described herein with respect to FIG. 2-FIG. 8.

Although some embodiments are described herein as including edge devices coupled to a switch fabric having a multi-stage switch, it should be understood that other embodiments are possible. For example, rather than edge devices coupled to a multi-stage switch, peripheral processing devices can be interconnected by a multi-path network having multiple switch nodes. Such embodiments, a separate schedule module can be, for example, coupled to or included within each switch node within the multi-path network.

In use, a data packet (e.g., an Ethernet packet) can be sent between peripheral processing devices 111-116 via portions of the switch fabric system 100. For example, as shown in FIG. 1, a data packet can be sent from a first peripheral processing device 113 to a second peripheral processing device 115 via path 170. The first peripheral processing device 113 can send the data packet to the edge device 181 via link 192. The edge device 181 can then prepare the data packet to enter the switch fabric 110 by disassembling the data packet into multiple data cells, which are then sent by the edge device 181 to the switch fabric 110 via link 193. The switch modules within the switch fabric 110 can route the data cells through the switch fabric 110 via one or more of the multiple paths within the switch fabric 110. The data cells are sent to the edge device 183 via link 194. The edge device 183 can reassemble the data cells into a data packet that is identical (or substantially identical) to the original data packet and then send the data packet to the second peripheral processing device 115 via link 195.

Figure 2:
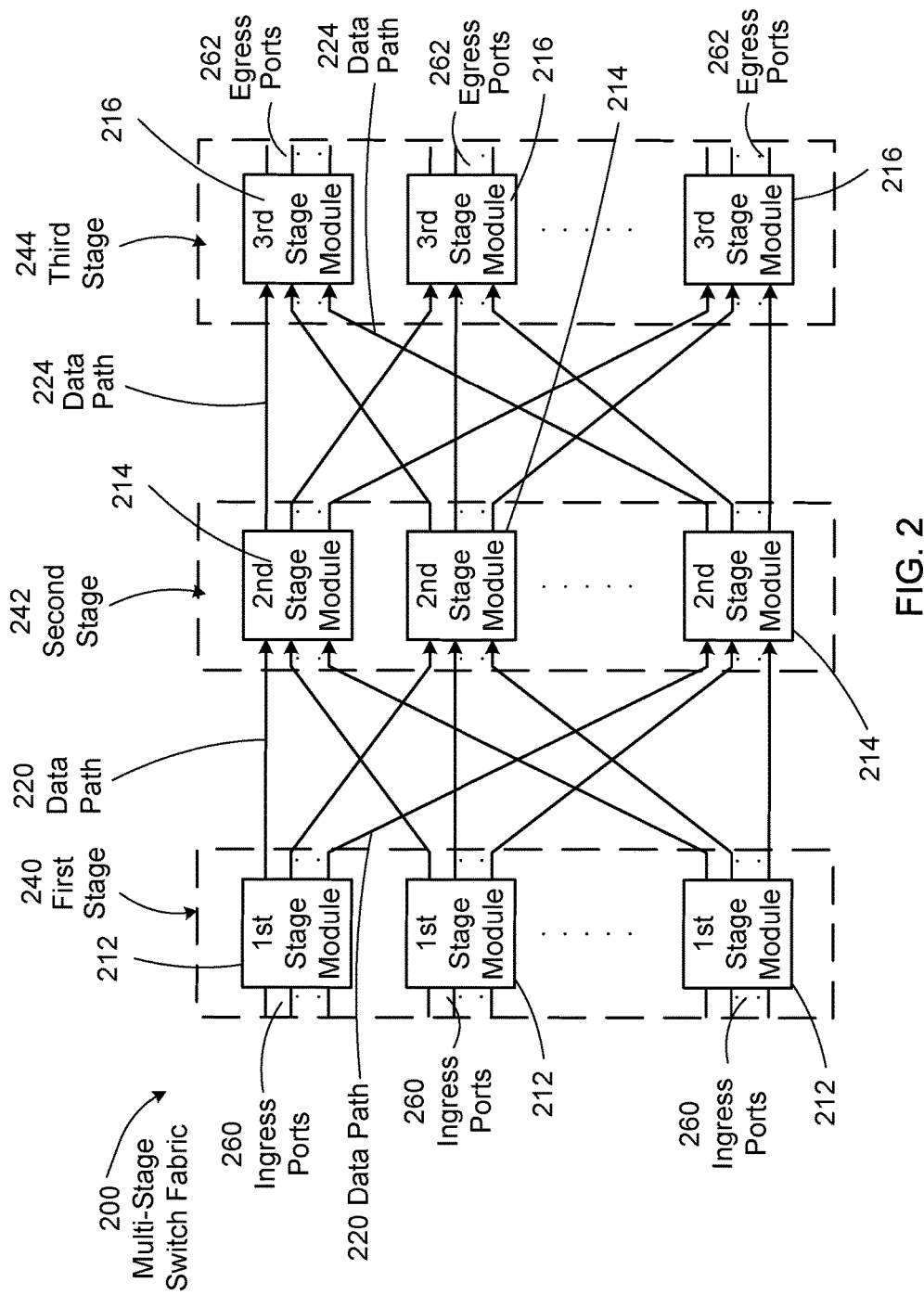
FIG. 2 is a schematic illustration of a multi-stage switch fabric, according to an embodiment.

FIG. 2 is a schematic illustration of a multi-stage switch fabric 200, according to an embodiment. The switch fabric 200 can include multiple physical hops that are within a single logical hop. In some embodiments, switch fabric 200 can be a multi-stage, non-blocking Clos network that includes a first stage 240, a second stage 242, and a third stage 244. The first stage 240 includes switch modules 212; the second stage 242 includes switch modules 214; the third stage 244 includes switch modules 216. Said another way, switch modules 212 of the first stage 240, switch modules 214 of the second stage 242 and switch modules 216 of the third stage 244 collectively define the multi-stage switch fabric 200.

In the switch fabric 200, each switch module 212 of the first stage 240 is an assembly of electronic components and circuitry. In some embodiments, for example, each switch module is an application-specific integrated circuit (ASIC). In other embodiments, multiple switch modules are contained on a single ASIC or a single chip package. In still other embodiments, each switch module is an assembly of discrete electrical components.

In some embodiments, each switch module 212 of the first stage 240 is a switch (e.g., a packet switch, a frame switch, an integrated Ethernet switch and/or a cell switch). The switches are configured to redirect data (e.g., data packets, data cells, etc.) as it flows through the switch fabric 200. In some embodiments, for example, each switch includes multiple ingress ports operatively coupled to write interfaces on a memory buffer (not shown in FIG. 2). Similarly, a set of egress ports are operatively coupled to read interfaces on the memory buffer. In some embodiments, the memory buffer can be a shared memory buffer implemented using on-chip static random access memory (SRAM) to provide sufficient bandwidth for all ingress ports to write one incoming data cell (e.g., a portion of a data packet) or data packet per time period (e.g., one or more clock cycles) and for all egress ports to read one outgoing data cell or data packet per time period. Each switch operates similarly to a crossbar switch that can be reconfigured in subsequent each time period.

Each switch module 212 of the first stage 240 includes a set of ingress ports 260 configured to receive data (e.g., a data cell) as it enters the switch fabric 200. For example, each ingress port 260 can be coupled to an edge device (e.g., edge devices 181, 182, 183 shown and described with respect to FIG. 1). In some embodiments, more than one ingress port 260 of a switch module 212 can be coupled to different ports of a common edge device via separate physical connections (e.g., multiple electrical cables, multiple fiber-optic cables, etc.). Accordingly, an edge device can send data to the switch fabric 200 via the ingress ports 260. In this embodiment, each switch module 212 of the first stage 240 includes the same number of ingress ports 260. Details of a switch module are described below with respect to FIG. 3.

Similar to the first stage 240, the second stage 242 of the switch fabric 200 includes switch modules 214. The switch modules 214 of the second stage 242 are structurally similar to the switch modules 212 of the first stage 240. Each switch module 214 of the second stage 242 is operatively coupled to each switch module 212 of the first stage 240 by a data path 220. Each data path 220 between a given switch module 212 of the first stage 240 and a given switch module 214 of the second stage 242 is configured to facilitate data transfer from the switch modules 212 of the first stage 240 to the switch modules 214 of the second stage 242.

The data paths 220 between the switch modules 212 of the first stage 240 and the switch modules 214 of the second stage 242 can be constructed in any manner configured to facilitate data transfer from the switch modules 212 of the first stage 240 to the switch modules 214 of the second stage 242. In some embodiments, for example, the data paths 220 are optical connectors between the switch modules. In other embodiments, the data paths 220 are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each switch module 214 of the second stage 242 with each switch module 212 of the first stage 240. In still other embodiments, two or more switch modules are contained within a single chip package and the data paths are electrical traces.

In some embodiments, the switch fabric 200 is a non-blocking Clos network. Thus, the number of switch modules 214 of the second stage 242 of the switch fabric 200 varies based on the number of ingress ports 260 of each switch module 212 of the first stage 240. In a rearrangeably non-blocking Clos network (e.g., a Benes network), the number of switch modules 214 of the second stage 242 is greater than or equal to the number of ingress ports 260 of each switch module 212 of the first stage 240. Thus, if n is the number of ingress ports 260 of each switch module 212 of the first stage 240 and m is the number of switch modules 214 of the second stage 242, m≥n. In some embodiments, for example, each switch module 212 of the first stage 240 has five ingress ports. Thus, the second stage 242 has at least five switch modules 214. Each of the switch modules 212 of the first stage 240 is operatively coupled to all the switch modules 214 of the second stage 242 by data paths 220. Said another way, each switch module 212 of the first stage 240 can send data to any switch module 214 of the second stage 242.

The third stage 244 of the switch fabric 200 includes switch modules 216. The switch modules 216 of the third stage 244 are structurally similar to the switch modules 212 of the first stage 240. The number of switch modules 216 of the third stage 244 is typically equivalent to the number of switch modules 212 of the first stage 240. Each switch module 216 of the third stage 244 includes egress ports 262 configured to allow data to exit the switch fabric 200. For example, each egress port 262 can be coupled to an edge device (e.g., edge devices 181, 182, 183 shown and described with respect to FIG. 1). In some embodiments, similar to switch module 212 of the first stage 240, more than one egress port 262 of a switch module 216 can be coupled to different ports of a common edge device via separate physical connections (e.g., multiple electrical cables, multiple fiber-optic cables, etc.). Accordingly, the edge device can receive data from the switch fabric 200 via the egress port 262. In this embodiment, each switch module 216 of the third stage 244 includes the same number of egress ports 262. Further, the number of egress ports 262 of each switch module 216 of the third stage 244 is typically equivalent to the number of ingress ports 260 of each switch module 212 of the first stage 240.

Each switch module 216 of the third stage 244 is connected to each switch module 214 of the second stage 242 by a data path 224. The data paths 224 between the switch modules 214 of the second stage 242 and the switch modules 216 of the third stage 244 are configured to facilitate data transfer from the switch modules 214 of the second stage 242 to the switch modules 216 of the third stage 244.

The data paths 224 between the switch modules 214 of the second stage 242 and the switch modules 216 of the third stage 244 can be constructed in any manner configured to facilitate data transfer from the switch modules 214 of the second stage 242 to the switch modules 216 of the third stage 244. In some embodiments, for example, the data paths 224 are optical connectors between the switch modules. In other embodiments, the data paths are within a midplane. Such a midplane can be used to connect each switch module 214 of the second stage 242 with each switch module 216 of the third stage 244. In still other embodiments, two or more switch modules are contained within a single chip package and the data paths are electrical traces.

In some embodiments, data can be routed through the switch fabric 200 using hash functions, lookup tables, routing tables and/or the like. For example, a first stage switch module 212 can determine to which second stage switch module 214 to send a data cell by using header values of the data cell as inputs to a hash function. A result of the hash function can be an identifier of a second stage switch module 214 and the first stage switch module 212 can send the data cell accordingly. Similarly, a second stage switch module 214 and/or a third stage switch module 216 can determine to which third stage switch module 216 or to which edge device (i.e., coupled to an egress port 262), respectively, to send the data cell, respectively, using such a hash function, a lookup table and/or a routing table.

In some embodiments, data cells can be routed through the switch fabric 200 using a random data path, including a second stage switch module 214 that is randomly selected by a first stage switch module 212, and/or a third stage switch module 216 that is randomly selected by the second stage switch module 214. Specifically, after receiving a data cell, a first stage switch module 212 can randomly select an egress port from a list of egress ports within the first stage switch module 212 to send the data cell to one of the second stage switch modules 214. An approach for randomly selecting an egress port from a list of egress ports is described in detail below with respect to FIGS. 4-5. Furthermore, in some embodiments, the second stage switch module 214 that receives the data cell can randomly select an egress port from a list of egress ports within the second stage switch module 214 to send the data cell to one of the third stage switch modules 216. In some other embodiments, the second stage switch module 214 that receives the data cell can send the data cell to a particular third stage switch module 216 from a particular egress port within the second stage switch module 214.

It should be understood that the random selection of a particular stage switch module will be performed for the set of stage switch modules that allow for delivery of a data cell to its destination, and will exclude remaining stage switch modules from which deliver of the data cell to its destination is not possible. For example, if a destination can be reached from certain third stage switch modules 216 but not other third stage switch modules 216, then the second stage switch module 214 performing random selection can randomly select from those certain third stage switch modules 216 but exclude the others.

After receiving a data cell, a third stage switch module 216 can forward the data cell to an edge device from one of the egress ports 262 within the third stage switch module 216. In some embodiments, a third stage switch module 216 can select an egress port from a set of egress ports coupled to a given edge device, to send each of the received data cells to the edge device based on a round robin selection for each received data cell. For example, a third stage switch module 216 can be configured to send the first data cell via the first egress port from a set of egress ports coupled to a given edge device, and send the second data cell via the second egress port from the set of egress ports coupled to the edge device, so on and so forth, until every egress port from the set of egress ports coupled to the edge device has been selected once to send a data cell. Then, the third stage switch module 216 is configured to send the next data cell via the first egress port from the set of egress ports coupled to the edge device again, and repeat the same pattern of the round robin selection for the subsequent data cells. Alternatively, the third stage switch module 216 can randomly select an egress port from the set of egress ports coupled to the edge device.

Figure 3:
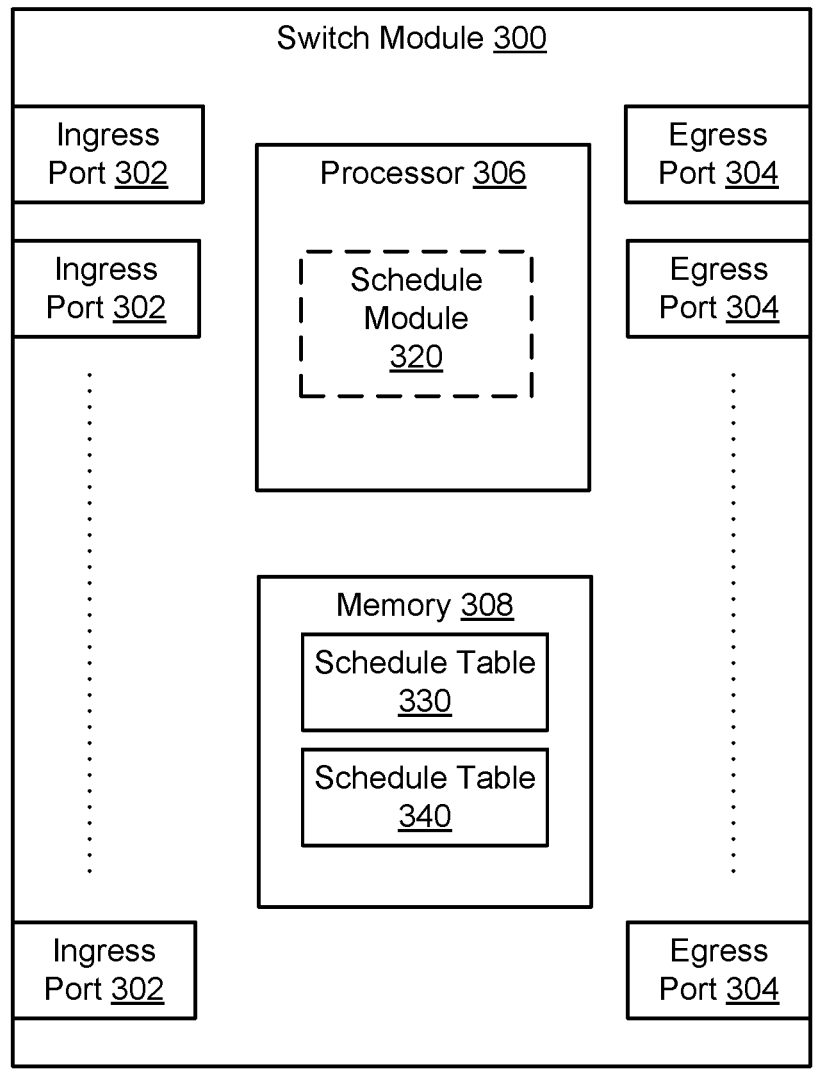
FIG. 3 is a schematic illustration of a switch module configured to forward data items, including receiving data items at ingress ports, forwarding data items to egress ports, and sending data items from egress ports, according to an embodiment.

FIG. 3 is a schematic illustration of a switch module 300 configured to forward data items (e.g., data cells, data packets), including receiving data items at ingress ports (e.g., ingress ports 302), forwarding data items to egress ports (e.g., egress ports 304), and sending data items from egress ports, according to an embodiment. The switch module 300 can be a switch module in a switch fabric that is configured to redirect data (e.g., data cells, data packets) as it flows through the switch fabric. For example, the switch module 300 can be a first stage switch module 212, a second stage switch module 214, or a third stage switch module 216 in the switch fabric 200 shown and described with respect to FIG. 2. Furthermore, the switch module 300 can be an assembly of electronic components and circuitry, or an application-specific integrated circuit (ASIC). As shown in FIG. 3, the switch module 300 includes multiple ingress ports 302, multiple egress ports 304, a processor 306 containing a schedule module 320, and a memory 308 containing schedule table 330 and schedule table 340. In some embodiments, the number of ingress ports 302 is the same as the number of egress ports 304. In some other embodiments, the number of ingress ports 302 and the number of egress ports 304 can be different.

The ingress ports 302 and egress ports 304 can be part of one or more communication interfaces and/or network interfaces (e.g., a 40 Gigabit (Gb) Ethernet interface, a 100 Gb Ethernet interface), through which the switch module 300 can send data (e.g., data flows of data cells) to and/or receive data from other devices (e.g., a switch module at a different stage in the switch fabric, an edge device coupled to the switch fabric) in a switch fabric system. The devices that communicate with the switch module 300 can be operatively coupled to one or more ingress ports 302 and/or egress ports 304 of the switch module 300 using any suitable connection such as, for example, an optical connection (e.g., an optical cable and optical connectors), an electrical connection (e.g., an electrical cable and electrical connectors), a wireless connection (e.g., a wireless link and wireless signal transceivers) and/or the like. Similarly stated, in some embodiments, the ingress ports 302 and egress ports 304 can implement a physical layer using twisted-pair electrical signaling via electrical cables, or fiber-optic signaling via fiber-optic cables, or wireless signaling via a wireless link between two wireless signal transceivers. In some embodiments, some of ingress ports 302 and/or egress ports 304 implement one physical layer such as twisted-pair electrical signaling and others of ingress ports 302 and/or egress ports 304 implement a different physical layer such as fiber-optic signaling.

Furthermore, the ingress ports 302 and egress ports 304 can allow the switch module 300 to communicate with other devices that are coupled to the switch module 300, such as, for example, other switch modules, computer servers, via one or more communication protocols (e.g., an Ethernet protocol, a multi-protocol label switching (MPLS) protocol, a Fibre Channel protocol, a Fibre-Channel-over Ethernet protocol, an Infiniband-related protocol, etc.). In some embodiments, some of ingress ports 302 and/or egress ports 304 implement one protocol such as Ethernet and others of ingress ports 302 and/or egress ports 304 implement a different protocol such as Fibre Channel. Thus, the switch module 300 can be in communication with multiple devices using homogeneous or heterogeneous physical layers and/or protocols via one or more ingress ports 302 and/or egress ports 304.

In some embodiments, after receiving a data cell at one ingress port 302, the switch module 300 can process the data cell (e.g., by processor 306), forward the data cell to an egress port 304 that is randomly selected by schedule module 320 from a list of egress ports 304 based on information provided by one or more schedule tables (e.g., schedule table 330, schedule table 340) stored in memory 308, and finally send the data cell from the selected egress port 304. Specifically, after a data cell is received at an ingress port 302, the processor 306 is configured to retrieve information from the data cell, including a destination identifier (e.g., a destination MAC address, a destination IP address, etc.) of the data cell. Based on the destination identifier of the data cell in conjunction with one or more schedule tables (e.g., schedule table 330, schedule table 340) stored in memory 308, schedule module 320 is configured to randomly select an egress port 304 from a list of egress ports 304, and provide an egress port indicator associated with the selected egress port 304 to the switch module 300. The received data cell is then forwarded to the egress port 304 that is associated with the egress port indicator provided by schedule module 320, from which the data cell is sent out by the switch module 300. Details of randomly selecting an egress port 304 from a list of egress ports 304 are described below in connection with FIGS. 4-5.

The schedule module 320 that selects an egress port 304 from a list of egress ports 304 to send a received data cell is executed within the processor 306 of the switch module 300. In some embodiments, one or more portions of the schedule module 320 can include a hardware-based module (e.g., application specific integrated circuit (ASIC), a digital signal processor (DSP), a field programmable gate array (FPGA)) and/or a software-based module (e.g., a module of computer code executed at a processor, a set of processor-readable instructions executed at a processor). In some embodiments, one or more of the functions associated with the schedule module 320 can be performed by different modules and/or combined into one or more modules. In some embodiments, the schedule module 320 can be included in one or more physical units such as a rack unit or chassis.

As shown in FIG. 3, schedule table 330 and schedule table 340 are stored in a memory 308 within the switch module 300. In some embodiments, the memory 308 can be, for example, a random-access memory (RAM) (e.g., a dynamic RAM, a static RAM), a flash memory, a removable memory, and/or so forth. In some embodiments, the schedule tables (e.g., schedule table 330, schedule table 340) can be implemented as, for example, a relational database, a table, and/or so forth. In some embodiments, schedule table 330 and schedule table 340 can each be stored in one or more locations within the memory 308. In some embodiments, although not shown in FIG. 3, the switch module 300 can include one or more schedule table schedule tables.

The schedule module 320 can use information included in a received data cell, and/or information provided by one or more schedule tables (e.g., schedule table 330, schedule table 340) to select an egress port 304 from a list of egress ports 304 to send the data cell. For example, the schedule module 320 can select an egress port 304 randomly, based on a list of egress ports 304 identified in the schedule tables, based on a credit value associated with each egress port 304, based on the results of a hash function, based on an indication from a central controller (not shown in FIG. 3) and/or using any other method. In some embodiments, such a schedule table and/or a hash function can use as an input a header value such as, for example, a destination identifier (e.g., a destination MAC address, a destination IP address), a source identifier (e.g., a source MAC address, a source IP address), a priority indicator, a transfer protocol and/or any other suitable value. In some embodiments, for example, a schedule table and/or a hash function can associate a range of destination IP and/or MAC addresses with a unique list of egress ports 304. In embodiments using a central controller, the central controller can monitor usage and/or congestion at each egress port 304 and dynamically modify the availability and/or other information (e.g., credit value) associated with the egress ports 304 accordingly, to optimize the flow of traffic through the switch fabric.

Figure 4:
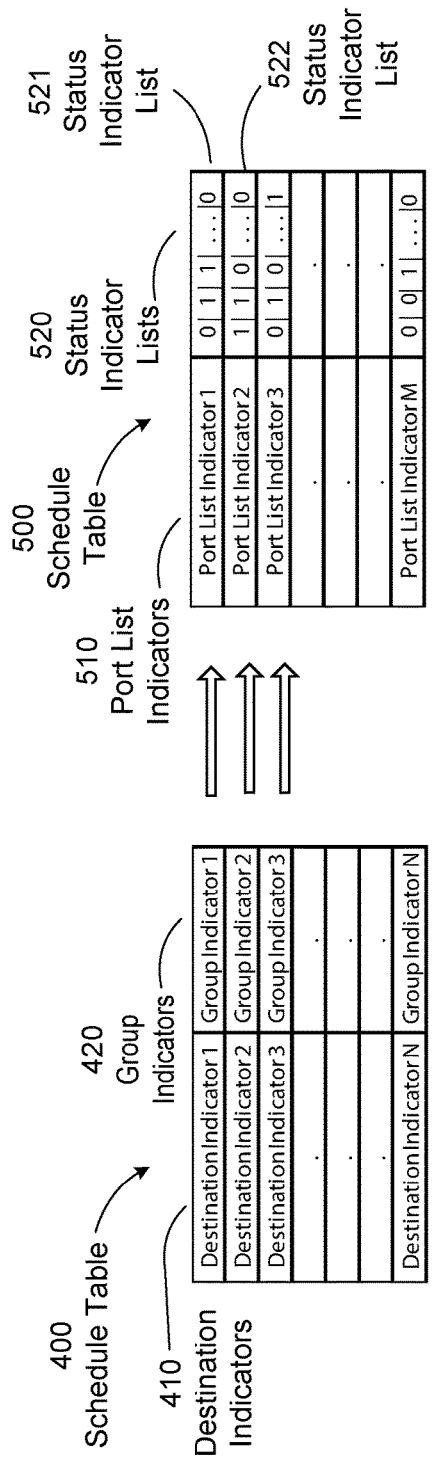
FIG. 4 is a schematic illustration of two schedule tables that are used in selecting egress ports for forwarding data items in a switch fabric, according to an embodiment.

FIG. 4 is a schematic illustration of two schedule tables (i.e., schedule table 400 and schedule table 500) that are used in selecting egress ports for forwarding data items in a switch fabric, according to an embodiment. Specifically, for each incoming data cell to a switch module (e.g., switch module 300 shown in FIG. 3), a schedule module operatively coupled to or within the switch module (e.g., schedule module 320 shown in FIG. 3) is configured to select an egress port from a list of egress ports within the switch module based on information retrieved from the data cell, schedule table 400 and schedule table 500.

As shown in FIG. 4, schedule table 400 has two columns of entries, shown as destination indicators (in column 410) and group indicators (in column 420). The first column of schedule table 400, column 410, contains destination indicators (e.g., destination indicator 1, destination indicator 2, etc.), each of which uniquely identifies one or a group of destination entities for one or more data cells, such as a single destination edge device, a group of destination edge devices, etc. A destination indicator can be determined based on information retrieved from a data cell that is received at the switch module, such as a destination identifier (e.g., a destination MAC address, a destination IP address) included in the data cell. In some embodiments, a destination indicator can be one or a group of destination identifiers of one or more data cells. For example, destination indicator 1 can be the MAC address for a destination edge device. For another example, destination indicator 2 can be a range of IP addresses for a group of destination edge devices. In some other embodiments, a destination indicator can be associated with one or more destination identifiers of one or more data cells. For example, a destination identifier of a data cell can be mapped to a destination indicator based on a look-up table stored in a memory within the switch module (not shown in FIG. 3). In some embodiments, more than one destination identifiers of data cells can be mapped to one destination indicator. In the embodiments discussed herein in connection with FIG. 4, each unique destination identifier of a data cell is associated with one and only one destination indicator in schedule table 400, such that each data cell is associated with one and only one entry (i.e., row) in schedule table 400.

The second column of schedule table 400, column 420, contains group indicators (e.g., group indicator 1, group indicator 2, etc.), each of which is uniquely associated with a destination indicator. In other words, each destination indicator in column 410 is mapped to a unique group indicator in column 420. For example, destination indicator 1 in column 410 is mapped to group indicator 1 in column 420, destination indicator 2 in column 410 is mapped to group indicator 2 in column 420, etc. In some embodiments, a group indicator can be an integer value representing an index of the associated destination indicator, such as 1, 2, 3, etc.

Although FIG. 4 is described with respect to two schedule tables, schedule table 400 and schedule table 500, it should be understood that schedule table 400 is optional and need not be present in some embodiments. In such embodiments, the destination indicators (shown in column 410) would be used to directly index schedule table 500. In other words, in embodiments having a single schedule table, the group indicators (shown in column 420) and/or the port list indicators (shown in column 510) would not be present and the schedule table can include destination indicators directly indexed to the port list indicators or the status indicators (shown in column 520).

Returning to the embodiment shown in FIG. 4, schedule table 500 has two columns of entries, shown as port list indicators (in column 510) and status indicator lists (in column 520). The first column of schedule table 500, column 510, contains port list indicators (e.g., port list indicator 1, port list indicator 2, etc.), each of which uniquely identifies a list of status indicators for all or some of the egress ports within the switch module. In some embodiments, a port list indicator can be an integer value representing an index of the associated list of status indicators, such as 1, 2, 3, etc. The second column of schedule table 500, column 520, contains status indicator lists (e.g., status indicator list 521 having the value of "0|1|1| . . . |0", status indicator list 522 having the value of "1|1|0| . . . |0", etc.), each of which is a list of status indicators that is indexed by the associated port list indicator in the same entry of schedule table 500. For example, port list indicator 1 is an index for status indicator list 521 having the value of "0|1|1| . . . |0", port list indicator 2 is an index for status indicator list 522 having the value of "1|1|0| . . . |0", etc.

Each status indicator list stored in column 520 of schedule table 500 contains a number of status indicators, each of which is associated with an egress port of the switch module. More specifically, each status indicator is associated with an egress port indicator, which uniquely identifies an egress port of the switch module. Thus, each status indicator from a status indicator list stored in column 520 of schedule table 500 indicates the status of an egress port of the switch module. For example, the leftmost status indicator in a status indicator list (e.g., the "0" at the leftmost position in status indicator list 521 having the value of "0|1|1| . . . |0", the "1" at the leftmost position in status indicator list 522 having the value of "1|1|0| . . . |0", etc.) indicates the status of a first egress port of the switch module. For another example, the second leftmost status indicator in a status indicator list (e.g., the "1" at the second leftmost position in status indicator list 521 having the value of "0|1|1| . . . |0", the "1" at the second leftmost position in status indicator 522 having the value of "1|1|0| . . . |0", etc.) indicates the status of a second egress port of the switch module. In some embodiments, each status indicator list stored in column 520 of schedule table 500 includes status indictors for all the egress ports within the switch module.

In some embodiments, at any given time, each status indicator has a value indicating the status of an egress port that is associated with the status indicator. In some embodiments, as shown in FIG. 4, a status indicator can have a first value, for example, "1", indicating the associated egress port is available for sending a data cell, and have a second value, for example, "0", indicating the associated egress port is not available for sending a data cell. The first value is different than the second value. In some embodiments, other values (e.g., any other integer) can be used as a status indicator to indicate the associated egress port being available or unavailable for sending a data cell. In some embodiments, a status indicator stored in an entry of schedule table 500 can be changed between the first value and the second value. For example, a status indicator from a status indicator list stored in schedule table 500 can be changed by a schedule module from "1" to "0" after the egress port associated with the status indicator is selected for sending a data cell. For another example, a status indicator from a status indicator list can be changed by a schedule module from "0" to "1" after each status indicator from that status indicator list is changed from "1" to "0" (in other words, after each egress port associated with a status indicator from the status indicator list is selected for sending a data cell).

Figure 5:
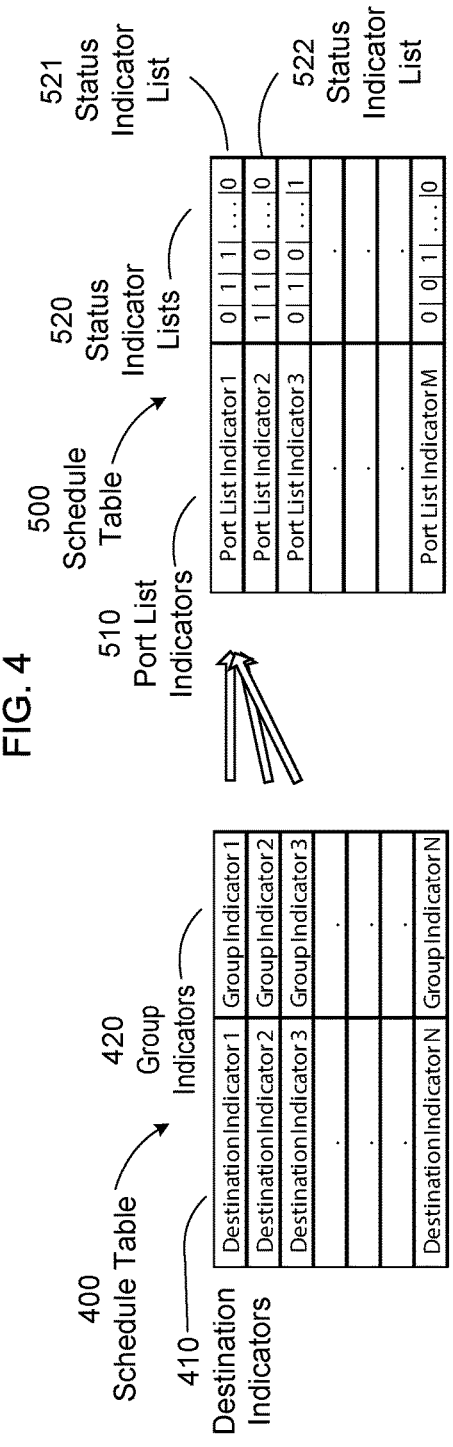
FIG. 5 is a schematic illustration of two schedule tables that are used in selecting egress ports for forwarding data items in a switch fabric, according to another embodiment.

In the embodiment shown in FIG. 4, each entry of schedule table 400, including a destination indicator in column 410 and a group indicator in column 420, is associated with at most one entry of schedule table 500, including a port list indicator in column 510 and a status indicator list in column 520. That is, an entry of schedule table 400 is associated with one unique entry of schedule table 500 if the switch module hosting the schedule table 400 and 500 has at least one path leading to the destination represented by the destination indicator in column 410 of that entry of schedule table 400; an entry of schedule table 400 is not associated with any entry of schedule table 500 if the switch module has no path leading to the destination. The mapping setting between entries of schedule table 400 and entries of schedule table 500 is represented by the arrows between schedule table 400 and schedule table 500 shown in FIG. 4. In some embodiments, such a mapping setting can be stored in a look-up table in a memory within the switch module (not shown in FIG. 3). For example, a look-up table that associates each group indicator in column 420 of schedule table 400 with a unique port list indicator in column 510 of schedule table 500 can be stored in a memory of the switch module. In some embodiments, the mapping setting between an entry of schedule table 400 and an entry of schedule table 500 can be changed by modifying one or more corresponding entries in the look-up table. For example, group indicator 2 stored in column 420 of schedule table 400 that is associated with port list indicator 2 stored in column 510 of schedule table 500 (as shown in FIG. 4) can be changed to being associated with port list indicator 1 stored in column 510 of schedule table 500 (as shown in FIG. 5) by modifying a corresponding entry in the look-up table accordingly.

In some embodiments, a schedule module of the switch module can be configured to select an egress port to send a data cell based on information retrieved from the data cell and information provided by the schedule tables stored in the switch module. After receiving a data cell, a destination identifier can be retrieved from the data cell. As described above, the destination identifier retrieved from the data cell can be used to determine a unique destination indicator that is associated with the data cell. For example, after a data cell is received at the switch module, a destination IP address of a destination edge device is retrieved from the data cell, and destination indicator 1 is determined to be associated with the destination IP address of the destination edge device according to a look-up table stored in a memory within the switch module that maps destination identifiers (i.e., destination IP addresses) to destination indicators for data cells.

Next, the determined destination indicator in column 410 can be used to locate an entry in schedule table 400, including a group indicator in column 420 of schedule table 400 that is associated with the destination indicator. Then, based on the group indicator, a unique port list indicator associated with the group indicator can be determined in column 510 of schedule table 500, which leads to a unique status indicator list in column 520 of schedule table 500. Thus, the unique status indicator list in column 520 is determined as being associated with the destination indicator in column 410. In the example of FIG. 4, destination indicator 1 in column 410 is used to locate the first entry in column 420 of schedule table 400, including group indicator 1. Furthermore, group indicator 1 in column 420 is determined to be associated with port list indicator 1 in column 510, which is stored in the first entry of schedule table 500, based on the mapping setting between entries of schedule table 400 and entries of schedule table 500. Finally, status indicator list 521 having the value of "0|1|1| . . . |0" stored in the first entry in column 520 of schedule table 500 is determined to be associated with destination indicator 1. Thus, the status indicator list 521 having the value of "0|1|1| . . . |0" indicates the status of each egress port of the switch module with respect to sending the data cell.

After a status indicator list is determined that indicates the status of each egress port of the switch module with respect to sending a data cell, a set of status indicators can be determined, where each status indicator from the set of status indicators is associated with an egress port of the switch module that is indicated by the status indicator as being available for sending the data cell. In some embodiments, a status indicator having a first value (e.g., "1") indicates the egress port associated with the status indicator is available for sending a data cell, and a status indicator having a second value (e.g., "0") different from the first value indicates the egress port associated with the status indicator is not available for sending the data cell. For example, as shown in FIG. 4, each status indicator having a value "1" indicates the egress port associated with the status indicator is available for sending the data cell; while each status indicator having a value "0" indicates the egress port associated with the status indicator is not available for sending the data cell.

Next, the schedule module of the switch module can be configured to select one status indicator from the set of status indicators, each of which is associated with an egress port that is available for sending the data cell. In some embodiments, a random method can be used to select one status indicator from the set of status indicators that represents the egress ports available for sending the data cell. More specifically, each status indicator from that set of status indicators is associated with a nonzero probability of being selected. Furthermore, in some embodiments, each status indicator from that set of status indicators can be associated with an equal (or substantially equal) probability of being selected. In other words, the schedule module is configured to select any status indicator from that set of status indicators with an equal (or substantially equal) probability. For example, the schedule module can be configured to select a status indicator from a set of five status indicators that represents five egress ports available for sending a data cell, such that any of the five status indicators can be selected with a probability of 0.2. For another example, the schedule module can be configured to select a status indicator from a set of ten status indicators that represents ten egress ports available for sending a data cell, such that any of the ten status indicators can be selected with a probability of 0.1. In some other embodiments, a round robin method can be used to select one status indicator from a set of status indicators that represents the egress ports available for sending a data cell. That is, each status indicator from such a set of status indicators can be selected according to a predetermined order, until every status indicator from the set of status indicators is selected.

In some embodiments, each egress port of a switch module can be associated with a credit value (not shown in FIG. 4), which can be a number used to determine the status indicator for that egress port. Specifically, if the credit value associated with an egress port is equal to or greater than a predetermined threshold, then the status indicator for the egress port can be the first value (e.g., "1") indicating that the egress port is available for sending a data cell. Otherwise, if the credit value associated with the egress port is less than the predetermined threshold, then the status indicator for the egress port can be the second value (e.g., "0") indicating that the egress port is not available for sending a data cell.

In some embodiments, each status indicator that is associated with an egress port available for sending a data cell can be selected to send the data cell with an equal (or substantially equal) probability, which is independent of the credit value associated with that egress port. In other words, an egress port associated with a higher credit value and another egress port associated with a lower credit value (both credit values are equal to or greater than a predetermined threshold) can be selected to send a data cell with an equal (or substantially equal) probability. In some other embodiments, the probability of an egress port being selected to send a data cell can be dependent on the credit value associated with that egress port. In such embodiments, a credit value associated with an egress port can represent the level of priority for selecting the egress port for sending a data cell from that egress port. For example, a higher credit value can represent a higher priority (i.e., a higher probability) for selecting the egress port associated with the higher credit value over selecting another egress port associated with a relatively lower credit value. For another example, the probability of a status indicator being selected can be proportional to the credit value of the egress port associated with the status indicator, given that credit value is equal to or greater than the predetermined threshold.

After a status indicator is selected by the schedule module from the set of status indicators associated with egress ports available for sending a data cell, an egress port indicator associated with the selected status indicator can be sent by the schedule module to a processor (e.g., processor 306 shown in FIG. 3) or another portion of the switch module, such that the data cell can be sent from an egress port associated with the egress port indicator. For example, after the second leftmost status indicator from status indicator list 521 having the value of "0|1|1| . . . |0" is selected by the schedule module, egress port indicator "2", which is associated with the second leftmost status indicator, is sent by the schedule module to a processor of the switch module, such that the data cell is sent from an egress port associated with egress port indicator "2".

In some embodiments, after a status indicator is selected from the set of status indicators by the schedule module, the schedule module can be configured to modify the value of the selected status indicator. Specifically, the schedule module can be configured to change the value of the selected status indicator from the first value to the second value. For example, after the second leftmost status indicator from status indicator list 521 having the value of "0|1|1| . . . |0" is selected by the schedule module, the schedule module is configured to change the value of the second leftmost status indicator from 1 to 0. As a result, the status indicator list stored in the first entry 521 of schedule table 500 is changed from "0|1|1| . . . |0" to "0|0|1| . . . |0".

In some embodiments, as discussed above, each status indicator of an egress port can be determined based on a credit value associated with that egress port. In such embodiments, after a status indicator is selected by the schedule module for sending a data cell, the schedule module can be configured to modify the credit value of the selected status indicator, instead of the value of the selected status indicator. Specifically, as a result of the status indicator being selected, the schedule module can be configured to reduce the credit value of the selected status indicator by a predefined amount. In some embodiments, the amount reduced from the credit value of the selected status indicator can be a fixed amount that is predetermined and identical across all status indicators. For example, after the second leftmost status indicator from status indicator list 521 having the value of "0|1|1| . . . |0" is selected by the schedule module, the credit value of the second leftmost status indicator is reduced by a fixed amount, which is the same as the amount reduced from the credit value of any other status indicator from the status indicator list if that status indicator is selected by the schedule module instead.

In some other embodiments, the amount reduced from the credit value of the selected status indicator can be different for different status indicators. For example, the amount reduced from the credit value of the second leftmost status indicator from status indicator list 521 having the value of "0|1|1| . . . |0", if the second leftmost status indicator is selected, can be different from the amount reduced from the credit value of the third leftmost status indicator from status indicator list 521, if the third leftmost status indicator is selected instead. Furthermore, in some embodiments, the amount reduced from the credit value of the selected status indicator can be dependent on the credit value, the selected status indicator, and/or the data cell that is to be sent. For example, after the second leftmost status indicator from status indicator list 521 having the value of "0|1|1| . . . |0" is selected by the schedule module, the credit value of the second leftmost status indicator can be reduced by 20%. In some embodiments, if a credit value of a status indicator is reduced to a negative value (i.e., lower than zero), the credit value is modified to zero by default, such that credit values of all status indicators can be always maintained as nonnegative values.

In some embodiments, if and only if a credit value of a status indicator is reduced to a value lower than the predetermined credit threshold, the schedule module can be configured to change the value of the status indicator from the first value to the second value. As a result, the status indicator is identified as being unavailable for sending the next data cell associated with a certain destination identifier. For example, after the credit value of the second leftmost status indicator from status indicator list 521 having the value of "0|1|1| . . . |0" is reduced to a value lower than a predetermined credit threshold in response to the second leftmost status indicator being selected, the schedule module is configured to change the value of the second leftmost status indicator from 1 to 0. As a result, the status indicator list stored in the first entry 521 of schedule table 500 is changed from "0|1|1| . . . |0" to "0|0|1| . . . |0", and the second leftmost status indicator is identified as not available for sending the next data cell. For another example, after the credit value of the third leftmost status indicator from status indicator list 521 having the value of "0|1|1| . . . |0" is reduced to a value not lower than the predetermined credit threshold in response to the third leftmost status indicator being selected, the schedule module is not triggered to change the value of the third leftmost status indicator. As a result, the status indicator list 521 stored in the first entry 521 of schedule table 500 remains as "0|1|1| . . . |0", and the egress port associated with the third leftmost status indicator is still available for sending the next data cell.

In some embodiments, when the value of every status indicator from a status indicator list is the second value (i.e., every egress port is not available for sending a data cell), the schedule module can be configured to change the value of all or a portion of the status indicators from the status indicator list to the first value. As a result, those status indicators are changed from being identified as unavailable for sending a data cell to being identified as available for sending a data cell again. In some embodiments, every status indicator from the status indicator list can be changed from the second value to the first value. For example, when every status indicator from a status indicator list has a value of 0, the schedule module is configured to increase the value of every status indicator from the status indicator list from 0 to 1. As a result, the status indicator list is changed from "0|0|0| . . . |0" to "1|1|1| . . . |1". In some other embodiments, a portion of status indicators from the status indicator list can be selected and then changed from the second value to the first value. In such embodiments, the selected status indicators can be selected randomly, or by any other suitable means.

In some embodiments, when the credit value associated with every egress port is lower than a predetermined credit threshold (equivalently, the status indicator of every egress port is the second value), the schedule module can be configured to increase the credit value of all or a portion of the egress ports. Specifically, the schedule module can be configured to increase the credit value for the egress port from a credit value lower than the predetermined credit threshold to a credit value equal to or greater than the credit threshold. For example, an equal credit value can be added to the remaining credit value for each egress port. As a result, the status indicator of every egress port whose credit value is increased to be equal to or above the credit threshold is changed from the second value to the first value. In some embodiments, the credit value added is the same for all egress ports. In some other embodiments, the credit value added can be different for different egress port.

In some embodiments, although not shown in FIG. 4, column 520 of schedule table 500 can contain credit value lists instead of status indicator lists. A credit value list is a list of credit values, each of which is associated with an egress port indicator that uniquely identifies an egress port of the switch module. An example of a credit value list is "0|3|5| . . . |0", where the credit value for the first egress port indicator is 0, the credit value for the second egress port indicator is 3, etc. In some embodiments, status indicators and/or status indicator lists can be used with the credit value lists, as described above. In some other embodiments, status indicators and/or status indicator lists may not be used.

Similar to the operation of selecting a status indicator, after receiving a data cell, the schedule module can be configured to randomly select an egress port associated with a credit value from a credit value list. Similar to a status indicator list, the credit value list can be determined as being associated with the data cell, for example, according to a destination identifier included in the data cell. As described above, an egress port can be selected from all the available egress ports (i.e., the egress ports whose credit value from the credit value list is equal to or above a predetermine credit threshold). In some embodiments, an egress port can be randomly selected from the available egress ports independent of the credit values associated with those available egress ports. For example, each available egress port can be selected with an equal (or substantially equal) probability. Alternatively, an egress port can be selected from the available egress ports in a round robin fashion. In some other embodiments, an egress port can be randomly selected from the available egress ports based on the credit value for each available egress port from the credit value list. For example, as described above, the selection can be done in a way such that an available egress port associated with a higher credit value can be selected with a probability higher than the probability of an available egress port associated with a lower credit value being selected. Finally, the egress port indicator of the selected egress port can be sent by the schedule module to a processor or another portion of the switch module, such that the data cell can be sent from the selected egress port.

In some embodiments, each credit value of an egress port from a credit value list equals each remaining credit value of another egress port from the credit value list. In some other embodiments, the credit value for a first egress port is different from the credit value for a second egress port from the credit value list. In some embodiments, a credit value of an egress port can be reduced by a predetermined amount as a result of that egress port being selected by the schedule module for sending an data cell, where the reduced amount can be a fixed amount, or an amount dependent on the original credit value, the selected egress port, and/or the data cell to be sent. In some embodiments, when the credit value of every egress port from a credit value list is lower than the predetermined credit threshold, the schedule module can be configured to increase the credit value for all or a portion of the egress ports from the credit value list, as described above.

Similar to FIG. 4, FIG. 5 is a schematic illustration of two schedule tables (i.e., schedule table 400 and schedule table 500) that are used in selecting egress ports for forwarding data items in a switch fabric, according to another embodiment. The schedule tables shown in FIG. 5, schedule table 400 and schedule table 500, are the same as the schedule tables shown and described with respect to FIG. 4, and are therefore not described in detail herein. The mapping setting between entries of schedule table 400 and entries of schedule table 500 in the embodiment shown in FIG. 5, however, is different from that in the embodiment shown in FIG. 4.

Specifically, as shown in FIG. 5, more than one entry of schedule table 400 can be associated with one entry of schedule table 500. For example, the first three entries of schedule table 400 are all associated with the first entry of schedule table 500. As a result, the look-up table that stores the mapping setting between entries of schedule table 400 and entries of schedule table 500 is different from the look-up table in the embodiment of FIG. 4. Furthermore, as described with respect to FIG. 4, the mapping setting between an entry of schedule table 400 and an entry of schedule table 500 can be changed by modifying one or more corresponding entries in the look-up table. For example, group indicator 2 stored in column 420 of schedule table 400 that is associated with port list indicator 1 stored in column 510 of schedule table 500 (as shown in FIG. 5) can be changed to being associated with port list indicator 2 stored in column 510 of schedule table 500 (as shown in FIG. 4) by modifying a corresponding entry in the look-up table accordingly. Thus, a switch module can be configured to assign a different status indicator list and/or credit value list to data cells associated with a specific destination identifier by modifying one or more corresponding entries in the look-up table accordingly, without changing any entry in schedule table 400 and schedule table 500.

In the embodiment shown in FIG. 5, instead of data cells associated with each unique destination indicator being provided with a unique status indicator list or credit value list from schedule table 500, data cells associated with multiple destination indicators can be provided with the same status indicator list or credit value list. As a result, an egress port is selected for sending a data cell associated with any of the multiple destination indicators, based on the same status indicator list or credit value list provided from schedule table 500. For example, as shown in FIG. 5, an egress port is selected for sending a data cell associated with destination indicator 1, destination indicator 2, or destination indicator 3, based on status indicator list 521 having the value of "0|1|1| . . . |0" or a credit value list (not shown in FIG. 5) that is stored in the first entry of schedule table 500.

Figure 6:
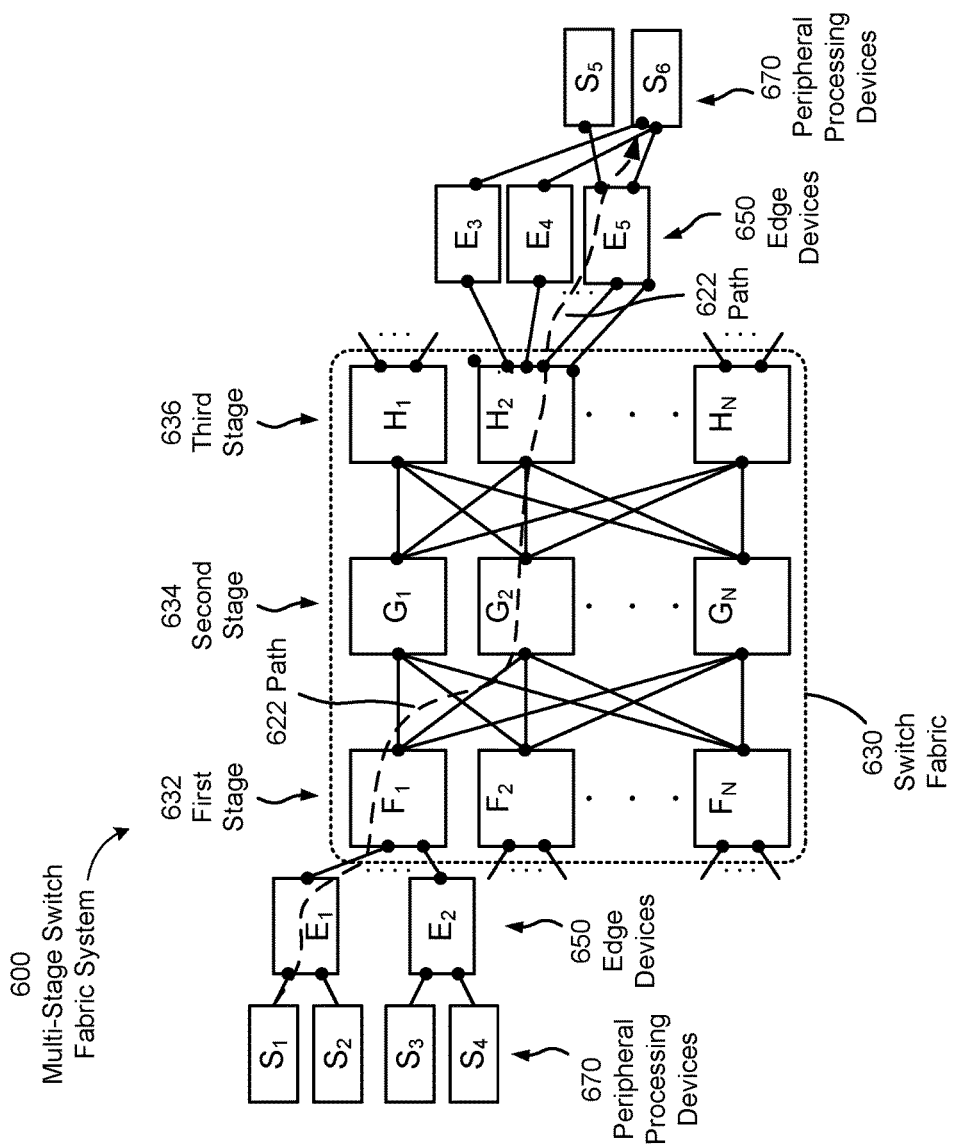
FIG. 6 is a schematic illustration of a multi-stage switch fabric system configured to forward data items, according to an embodiment.

FIG. 6 is a schematic illustration of a multi-stage switch fabric system 600 configured to forward data items, according to an embodiment. The switch fabric system 600 includes a switch fabric 630, multiple edge devices 650 operatively coupled to the switch fabric 630, and multiple peripheral processing devices 670 operatively coupled to the edge devices 650. As described in further detail herein, a first peripheral processing device 670 (e.g., $S_1$) is configured to send a data packet to a second peripheral processing device 670 (e.g., $S_6$) via a first edge device 650 (e.g., $E_1$), the switch fabric 630, and a second edge device 650 (e.g., $E_5$), shown as the path 622 in FIG. 6.

The switch fabric 630 can be structurally and functionally similar to the multi-stage switch fabric 200 described with respect to FIG. 2. Accordingly, the switch fabric 630 includes switch modules $F_1$-$F_N$ associated with a first stage 632 of the switch fabric 630, switch modules $G_1$-$G_N$ associated with a second stage 634 of the switch fabric 630, and switch modules $H_1$-$H_N$ associated with a third stage 636 of the switch fabric 630. Said another way, switch modules $F_1$-$F_N$ associated with the first stage 632, switch modules $G_1$-$G_N$ associated with the second stage 634 and switch modules $H_1$-$H_N$ associated with the third stage 636 collectively define the multi-stage switch fabric 630.

Each of the switch modules within the switch fabric 630 can be structurally and functionally similar to the switch module 300 described with respect to FIG. 3. In some embodiments, although not shown in FIG. 6, some of the switch modules within the switch fabric 630 include a schedule module, which is configured to select egress ports for the switch modules for sending data cells. Particularly, in some embodiments, each of the switch modules associated with the first stage 632 (e.g., switch modules $F_1$-$F_N$) and/or the second stage 634 (e.g., switch modules $G_1$-$G_N$) includes a unique schedule module.

Each switch module $F_1$-$F_N$ associated with the first stage 632 is operatively coupled to each switch module $G_1$-$G_N$ associated with the second stage 634 via data paths. Similarly, each switch module $G_1$-$G_N$ associated with the second stage 634 is operatively coupled to each switch module $H_1$-$H_N$ associated with the third stage 636 via data paths. The data paths between the switch modules $F_1$-$F_N$ associated with the first stage 632 and the switch modules $G_1$-$G_N$ associated with the second stage 634 and/or the data paths between the switch modules $G_1$-$G_N$ associated with the second stage 634 and the switch modules $H_1$-$H_N$ associated with the third stage 636 can be constructed in any manner configured to facilitate data transfer. In some embodiments, for example, the data paths include optical connectors, optical fibers and/or electrical connectors between the switch modules. In some embodiments, the data paths are within a midplane or a backplane.

The peripheral processing devices 670 can be structurally and functionally similar to the peripheral processing devices 111-116 described with respect to FIG. 1. Specifically, the peripheral processing devices 670 can be, for example, compute nodes, service nodes, routers, and storage nodes, etc. The peripheral processing devices 670 can be operatively coupled to the edge devices 650 using any suitable connection such as, for example, an optical connection (e.g., an optical cable and optical connectors), an electrical connection (e.g., an electrical cable and electrical connectors) and/or the like. As such, the peripheral processing devices 670 are configured to send data (e.g., data packets, data cells, etc.) to the edge devices 650.

The edge devices 650 can be structurally and functionally similar to the edge devices 181-183 described with respect to FIG. 1. Specifically, the edge devices 650 can be any devices configured to operatively couple peripheral processing devices 670 to the switch fabric 630. In some embodiments, for example, the edge devices 650 can be access switches, input/output modules, top-of-rack devices and/or the like. Edge devices $E_1$ and $E_2$ are schematically shown as source edge devices and edge devices $E_3$, $E_4$ and $E_5$ are schematically shown as destination edge devices for illustration purposes only. Structurally, the edge devices 650 (including $E_1$-$E_5$) can function as both source edge devices and destination edge devices. Accordingly, the edge devices 650 can send data to and receive data from the switch fabric 630.

While shown in FIG. 6 as being operatively coupled to a single switch module $F_1$ associated with the first stage 632, the edge device $E_1$ can be coupled to multiple switch modules associated with the first stage 632. Additionally, while shown in FIG. 6 as being operatively coupled to a single switch fabric 630, the edge device $E_1$ can be operatively coupled to multiple switch fabrics, similar to switch fabric 630. In some embodiments, for example, the edge device $E_1$ can be both coupled to the switch module $F_1$ associated with the first stage 632 of the switch fabric 630 and a switch module associated with a first stage of a second switch fabric (not shown in FIG. 6). In such embodiments, the edge device $E_1$ can send data to either the switch module $F_1$ or the switch module associated with the first stage of the second switch fabric.

In some embodiments, the edge devices 650 (e.g., edge device $E_1$) can be configured to prepare a data packet to enter the switch fabric 630. For example, the edge devices 650 can be configured to disassemble a data packet into multiple data cells prior to sending the data cells to the switch fabric 630. In some embodiments, for example, the edge devices 650 can append a source identifier (e.g., source MAC address, source IP address, etc.), a destination identifier (e.g., destination MAC address, destination IP address, etc.) and/or any other information to each of the data cells. Such information can be used to route the data cells through the switch fabric 630. Similarly, in some embodiments, after receiving data cells from the switch fabric 630, the edge devices 650 (e.g., edge device $E_5$) can be configured to reassemble multiple data cells into one or more data packets prior to sending the data packet(s) to a peripheral processing device 670.

In use, for example, a peripheral processing device $S_1$ can be configured to send a data packet to another peripheral processing device $S_6$. FIG. 6 represents peripheral processing device $S_1$ sending a data packet to peripheral processing device $S_6$ via a path 622. Any peripheral processing device 670 operatively coupled to the switch fabric 630 via an edge device 650 can be configured to send a data packet to any other peripheral processing device 670 coupled to the switch fabric 630 via an edge device 650 in a similar way.

As a first step, peripheral processing device $S_1$ can send the data packet destined to peripheral processing device $S_6$ to edge device $E_1$. Edge device $E_1$ can determine another edge device (e.g., edge device $E_5$) as the destination device for the data packet based on, for example, information retrieved from the data packet, and identify a destination identifier for that destination device, such as a destination MAC address, a destination IP address, etc. Edge device $E_1$ can disassemble the data packet into multiple data cells, each of which includes the destination identifier that is the same for all data cells that are disassembled from the data packet. Using the destination identifier and/or other information included in the data cells, edge device $E_1$ can determine to which switch module $F_1$-$F_N$ to send the data cells and send the data cells accordingly. In some embodiments, for example, edge device $E_1$ can use a hash function using as inputs the destination MAC address, the destination IP address, the source MAC address, the source IP address, and/or the transfer protocol identifier to determine to which switch module $F_1$-$F_N$ to send the data cells. In the example of FIG. 6, edge device $E_1$ determines to send the data cells to switch module $F_1$ and sends the data cells accordingly.

After a switch module associated with the first stage 632 (e.g., switch module $F_1$, switch module $F_2$, etc.) receives a data cell from an edge device 650 (e.g., edge device $E_1$), the switch module can determine to which switch module associated with the second stage 634 (e.g., switch module $G_1$, switch module $G_2$, etc.) to send the data cell, and then send the data cell accordingly. Specifically, a schedule module within the switch module associated with the first stage 632 can be configured to select (e.g., select randomly, select using a round-robin fashion, etc.) an egress port from a list of egress ports, each of which is operatively coupled to one of a set of switch modules associated with the second stage 634 that can lead to the destination of the data cell (e.g., edge device $E_5$), and then the switch module can send the data cell from the selected egress port to the switch module operatively coupled to the selected egress port. In the example of FIG. 6, after switch module $F_1$ receives a data cell from edge device $E_1$, a schedule module within switch module $F_1$ is configured to select an egress port from a list of egress ports that is operatively coupled to switch module $G_2$ associated with the second stage 634. Thus, switch module $F_1$ sends the data cell from the selected egress port to switch module $G_2$. Details of selecting an egress port by a schedule module within a switch module are described above with respect to FIGS. 3-5.

Similarly stated, after a switch module associated with the second stage 634 (e.g., switch module $G_1$, switch module $G_2$, etc.) receives a data cell from a switch module associated with the first stage 632 (e.g., switch module $F_1$, switch module $F_2$, etc.), the switch module associated with the second stage 634 can determine to which switch module associated with the third stage 636 (e.g., switch module $H_1$, switch module $H_2$, etc.) to send the data cell and send the data cell accordingly. In the example of FIG. 6, after switch module $G_2$ receives a data cell from switch module $F_1$, a schedule module within switch module $G_2$ is configured to select an egress port from a list of egress ports that is operatively coupled to switch module $H_2$ associated with the third stage 636. Thus, switch module $G_2$ sends the data cell from the selected egress port to switch module $H_2$.

After a switch module associated with the third stage 636 (e.g., switch module $H_1$, switch module $H_2$, etc.) receives a data cell from a switch module associated with the second stage 634 (e.g., switch module $G_1$, switch module $G_2$, etc.), the switch module associated with the third stage 636 can determine to which edge device (e.g., edge device $E_3$, edge device $E_4$, edge device $E_5$) to send the data cell based on the destination identifier included in the data cell. In some embodiments, if the switch module associated with the third stage 636 is connected to that edge device via multiple egress ports (e.g., edge device $E_5$ as in FIG. 6), the switch module associated with the third stage 636 can determine from which egress port to send the data cell to the selected edge device (e.g., edge device $E_5$), and then send the data cell accordingly. Note that if an edge device (e.g., edge device $E_5$) is selected by the switch module associated with the third stage 636 to send a first data cell disassembled from a data packet, the switch module is configured to send every other data cell disassembled from the same data packet to the same edge device, such that the data cells can be reassembled into the data packet at that edge device.

In some embodiments, when a peripheral processing device is connected by a single edge device to the switch fabric 630, all data packets destined to the peripheral processing device are sent to the single edge device before they reach the peripheral processing device. As a result, the edge device responsible for disassembling a data packet destined to the peripheral processing device into multiple data cells can designate only that single edge device as the destination device for each data cell disassembled from a data packet destined to the peripheral processing device. Thus, all data cells are sent to and reassembled into the original data packets at that single edge device before the reassembled data packets are sent to the peripheral processing device. For example, as shown in FIG. 6, when edge device $E_1$ receives a data packet destined to peripheral processing device $S_5$, because peripheral processing device $S_5$ is only connected to edge device $E_5$, edge device $E_1$ can determine only edge device $E_5$ as the destination device for the data cells disassembled from the received data packet. As a result, all data cells are sent to and reassembled at edge device $E_5$, before the reassembled data packets are sent to peripheral processing device $S_5$ from edge device $E_5$.

In some other embodiments, when a peripheral processing device is connected by multiple edge devices to the switch fabric 630, data packets destined to the peripheral processing device can be sent to any of the multiple edge devices before they reach the peripheral processing device. As a result, the edge device responsible for disassembling a data packet destined to the peripheral processing device into multiple data cells can designate any of the multiple edge devices as the destination device for data cells disassembled from a data packet destined to the peripheral processing device. Thus, the data cells disassembled from a data packet can be sent to and reassembled into the original data packet at any of the multiple edge devices before the reassembled data packet is sent to the peripheral processing device. For example, as shown in FIG. 6, when edge device $E_1$ receives a data packet destined to peripheral processing device $S_6$, because peripheral processing device $S_6$ is connected to edge device $E_3$, $E_4$ and $E_5$, edge device $E_1$ can determine edge device $E_3$, $E_4$ or $E_5$ as the destination device for the data cells disassembled from the received data packet. As a result, data cells disassembled from the data packet are sent to and reassembled at edge device $E_3$, $E_4$ or $E_5$, before the reassembled data packet is sent to peripheral processing device $S_6$ from edge device $E_3$, $E_4$ or $E_5$.

In some embodiments, a switch module within the switch fabric 600 (e.g., a switch module associated with the first stage 632, a switch module associated with the second stage 634, a switch module associated with the third stage 636) can be configured to select an egress port from a list of eligible egress ports (i.e., the egress ports that can lead to the destination device) in a random fashion, based on a round robin selection, or in any other suitable means. For example, as shown in FIG. 6, after switch module $H_2$ receives a data cell destined to edge device $E_5$ from switch module $G_2$, switch module $H_2$ is configured to select an egress port from a set of egress ports that are operatively coupled to edge device $E_5$, and then send the data cell from the selected egress port to edge device $E_5$. The selected egress port can be selected from the set of egress ports operatively coupled to edge device $E_5$ by switch module $H_2$ based on a round robin selection for the data cell. According to the round robin selection, as an example, switch module $H_2$ is configured to select a first egress port from the set of egress ports operatively coupled to edge device $E_5$ for a first data cell, select a second egress port from the set of egress ports operatively coupled to edge device $E_5$ for a consecutive second data cell, select a third egress port from the set of egress ports operatively coupled to edge device $E_5$ for a consecutive third data cell, so on and so forth until every egress port from the set of egress ports operatively coupled to edge device $E_5$ has been selected once, and then repeat the same round robin pattern to select egress ports from the set of egress ports operatively coupled to edge device $E_5$, starting from the first egress port again, for sending subsequent data cells.

After an edge device (e.g., edge device $E_3$, edge device $E_4$, edge device $E_5$) receives all the data cells that are disassembled from a data packet from a switch module associated with the third stage 636 (e.g., switch module $H_1$, switch module $H_2$, etc.), the edge device can reassemble the data cells into the original data packet. Next, the edge device can determine to which peripheral processing device (e.g., $S_5$, $S_6$) to send the reassembled data packet and send the data packet accordingly. In the example of FIG. 6, after edge device $E_5$ receives all the data cells disassembled from a data packet at edge device $E_1$, from switch module $H_2$, edge device $E_5$ is configured to reassemble the data cells into the original data packet, and then send the reassembled data packet to peripheral processing device $S_6$ accordingly.

Figure 7:
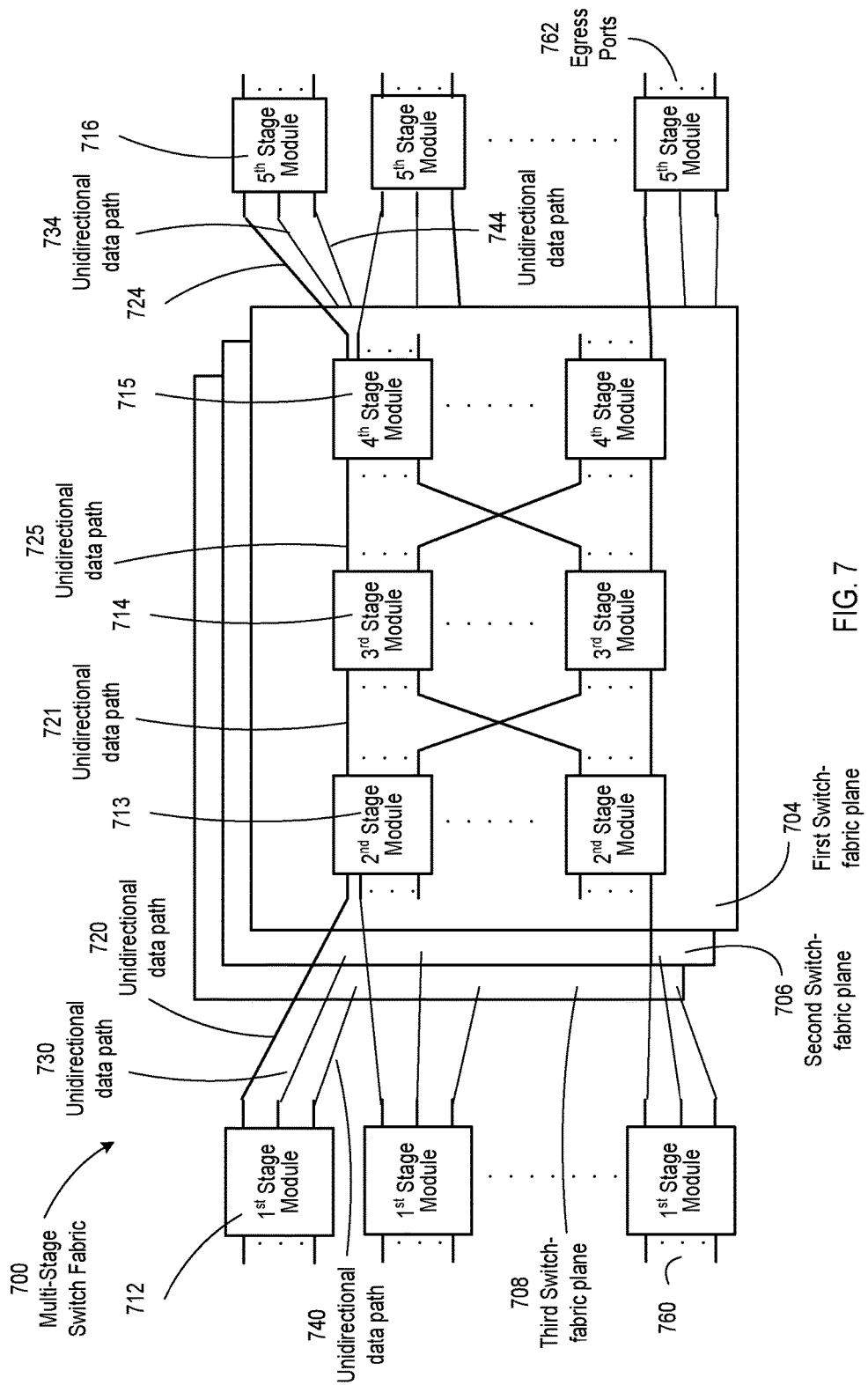
FIG. 7 is a schematic illustration of a multi-stage switch fabric, according to another embodiment.

FIG. 7 is a schematic illustration of a multi-stage switch fabric 700, according to another embodiment. The switch fabric 700 includes a first switch-fabric plane 704, a second switch-fabric plane 706, and a third switch-fabric plane 708. Data can be input to any of the three switch-fabric planes 704, 706, 708. Similarly, data can be output from any of the three switch-fabric planes 704, 706, 708. The second switch-fabric plane 706 and the third switch-fabric plane 708 are functionally and structurally similar to the first switch-fabric plane 704, and are therefore not described in detail herein.

The first switch-fabric plane 704 contains a three-stage switch fabric, similar to the three-stage switch fabric 200 described above with respect to FIG. 2. Specifically, the first switch-fabric plane 704 includes switch modules 713 of a second stage of the switch fabric 700, switch modules 714 of a third stage of the switch fabric 700, and switch modules 715 of a fourth stage of the switch fabric 700. Said another way, switch modules 713, switch modules 714 and switch modules 715 collectively define a portion of a five-stage switch fabric that is located on the first switch-fabric plane 704. Switch modules 712 of a first stage and switch modules 716 of a fifth stage of the switch fabric 700 are not included on the first switch-fabric plane 704. Switch modules 712, switch modules 713, switch modules 714, switch modules 715 and switch module 716 collectively define the five-stage switch fabric 700.

Each switch module 712 of the first stage has multiple ingress ports 760 configured to receive data (e.g., a data cell) as it enters the switch fabric 700. Similarly, each switch module 716 of the fifth stage has multiple egress ports 762 configured to allow data to exit the switch fabric 700. In some embodiments, the number of ingress ports 760 of a switch module 712 is the same as the number of egress ports 762 of a switch module 716. Each switch module 712 of the first stage is operatively coupled to a switch module 713 of the second stage on each of the switch-fabric planes 704, 706, 708 by a unidirectional data path 720, 730, 740, respectively. Thus, each switch module 712 of the first stage can send data cells to any of the switch-fabric planes 704, 706, 708.

Within the first switch-fabric plane 704, each switch module 713 of the second stage is operatively coupled to each switch module 714 of the third stage, and each switch module 714 of the third stage is operatively coupled to each switch module 715 of the fourth stage, by unidirectional data paths 721, 725, respectively. Each switch module 713 of the second stage within the first switch-fabric plane 704 is not operatively coupled to the switch modules of the third stage within the other switch-fabric planes 706, 708. Similarly, each switch module 714 of the third stage within the first switch-fabric plane 704 is not operatively coupled to the switch modules of the fourth stage within the other switch-fabric planes 706, 708. Each switch module 716 of the fifth stage is operatively coupled to a switch module 715 of the fourth stage on each of the switch-fabric planes 704, 706, 708 by a unidirectional data path 724, 734, 744, respectively. Thus, each switch-fabric plane 704, 706, 708 can send data to any of the switch modules 716 of the fifth stage. The unidirectional data paths 720, 730, 740, 721, 725, 724, 734, 744 are configured to transfer data through the switch fabric 700.

Similar to switch module 300 shown and described in connection with FIG. 3, each switch module of a stage within the switch fabric 700 can be configured to send data cells to one or more switch modules of a subsequent stage and/or one or more edge devices connected to the switch fabric 700. The random selection method, the round robin selection method, or any other suitable selection method can be applied by each switch module 712 of the first stage, each switch module 713 of the second stage, each switch module 714 of the third stage, and each switch module 715 of the fourth stage. Specifically, a schedule module within or operatively coupled to a switch module of the first, the second, the third, or the fourth stage can be configured to select an egress port of the switch module that is coupled to a switch module of a subsequent stage, such that one or more data cells can be sent from the selected egress port to the switch module of the subsequent stage.

In some embodiments, various selection methods can be applied by switch modules of different stages within the switch fabric 700 to select a switch module of a subsequent stage or an edge device connected to the switch fabric 700 to send data cells. For example, switch modules 712 of the first stage, switch modules 713 of the second stage, and switch modules 714 of the third stage can apply the random selection method described with respect to FIGS. 3-5 to select an egress port to send data cells to a switch module of a subsequent stage; switch modules 715 of the fourth stage can apply a hash function method, as described with respect to FIG. 2, to select an egress port to send data cells to a switch module 716 of the fifth stage; and switch modules 716 of the fifth stage can apply a round robin selection method, as described with respect to FIG. 2 and FIG. 6, to select an egress port to send data cells to an edge device connected to the switch fabric 700.

Figure 8:
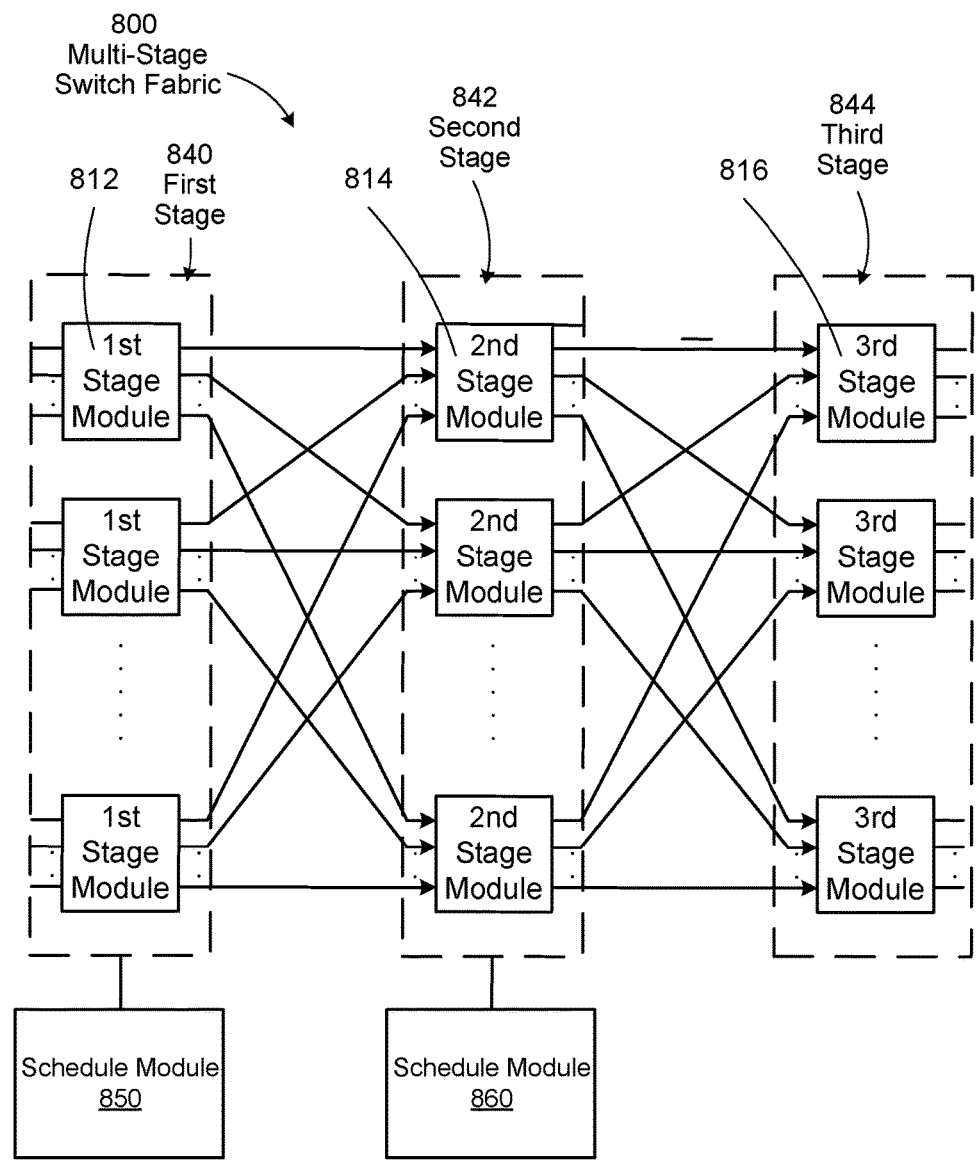
FIG. 8 is a schematic illustration of a multi-stage switch fabric in which switch modules of one stage can be associated with a common schedule module, according to another embodiment.

FIG. 8 is a schematic illustration of a multi-stage switch fabric 800 in which switch modules of one stage (e.g., switch modules 812 of stage 840, switch modules 814 of stage 842) can be associated with a common schedule module (e.g., schedule module 850, schedule module 860), according to another embodiment. In some embodiments, switch fabric 800 can be a multi-stage, non-blocking Clos network that includes a first stage 840, a second stage 842, and a third stage 844. The first stage 840 includes switch modules 812; the second stage 842 includes switch modules 814; the third stage 844 includes switch modules 816. Said another way, switch modules 812 of the first stage 840, switch modules 814 of the second stage 842 and switch modules 816 of the third stage 844 collectively define the multi-stage switch fabric 800. Switch fabric 800 is structurally and functionally similar to switch fabric 200 shown and described with respect to FIG. 2, and is therefore not described in detail herein.

In some embodiments, multiple switch modules associated with a stage within a switch fabric can be operatively coupled to a schedule module. As shown in FIG. 8, switch modules 812 of the first stage 840 are operatively coupled to schedule module 850, and switch modules 814 of the second stage 842 are operatively coupled to schedule module 860. The schedule module operatively coupled to the switch modules associated with a stage can be shared by the switch modules of the stage, such that the schedule module can be configured to randomly select an egress port from a list of egress port for sending a data cell from each of the switch modules of the stage.

In some embodiments, after receiving a data cell, a switch module of a stage determines a status indicator list or a credit value list based on a destination identifier retrieved from the data cell, and sends the status indicator list or the credit value list and/or other information to the schedule module for that stage. In such embodiments, each switch module maintains its own schedule tables, which are stored in a memory within the switch module. Such a switch module is similar to switch module 300 shown and described with respect to FIG. 3, and the schedule tables stored in each switch module are similar to schedule table 400 and schedule table 500 shown and described with respect to FIGS. 4-5. The schedule module for that stage communicates with each switch module of that stage to retrieve information of the status indicator lists or credit value lists, and to update values of status indicators or credit values associated with egress ports accordingly. In such embodiments, each credit value from a credit value list stored in a schedule table within a switch module of that stage is associated with an egress port of that switch module.

In some other embodiments, after receiving a data cell, a switch module of a stage retrieves a destination identifier from the data cell, and sends the destination identifier and/or other information of the data cell to the schedule module for that stage. The schedule module determines a status indicator list or a credit value list based on the destination identifier and/or other information of the data cell. In such embodiments, each individual switch module of that stage does not have its own schedule tables. Instead, all switch modules of that stage within the switch fabric share one or more common schedule tables, which are stored in a memory within or accessible to the associated schedule module. The schedule module is configured to retrieve information of the status indicator lists or credit value lists from the schedule tables for each switch module of the stage, and to update values of status indicators or credit values associated with egress ports accordingly. In such embodiments, all switch modules of the stage within the switch fabric have a same number of egress ports. Furthermore, each egress port associated with a credit value from a credit value list stored in a common schedule table can represent an egress port of every switch module of the stage within the switch fabric.

After a status indicator list or a credit value list is determined for a received data cell, the schedule module is configured to select one status indicator from the status indicator list, or select one egress port based on the credit value list. In some embodiments, such a selection can be done randomly, in a round robin fashion, using a hash function, or in any other suitable means. In some embodiments, the selection can be done based on a credit value associated with each of the status indicators and/or each of the egress ports. Particularly, the random selection process is similar to the random selection process described above with respect to FIGS. 4-5, and is therefore not described in detail herein.

After a status indicator is selected from a status indicator list, an egress port indicator associated with the selected status indicator is sent by the schedule module to the switch module at which the data cell was received. Alternatively, after an egress port is selected based on a credit value list, the egress port indicator of the selected egress port is sent by the schedule module to the switch module. Thus, the switch module sends the data cell from the egress port associated with the received egress port indicator. In the example of FIG. 8, each switch module 812 of the first stage 840 uses schedule module 850 to select an egress port for sending a data cell to one of the switch modules 814 of the second stage 842, and each switch module 814 of the second stage 842 uses schedule module 860 to select an egress port for sending a data cell to one of the switch modules 816 of the third stage 844.

In some embodiments, each of the switch modules associated with a stage within a switch fabric can be operatively coupled to, or include, a unique schedule module. Returning to FIG. 2, although not explicitly shown in FIG. 2, each switch module 212 of the first stage 240 and each switch module 214 of the second stage 242 includes its own schedule module. Unlike switch modules 812 of the first stage 840 and switch modules 814 of the second stage 842 shown in FIG. 8, each switch module 212 of the first stage 240 and each switch module 214 of the second stage 242 uses its own schedule module that is included within the switch module 212 or the switch module 214, to select an egress port for sending a data cell from the switch module 212 or the switch module 214. Similar to switch modules 212 and switch modules 214, switch module 300 is a switch module that includes its own schedule module, as described in detail with respect to FIG. 3.

Figure 9:
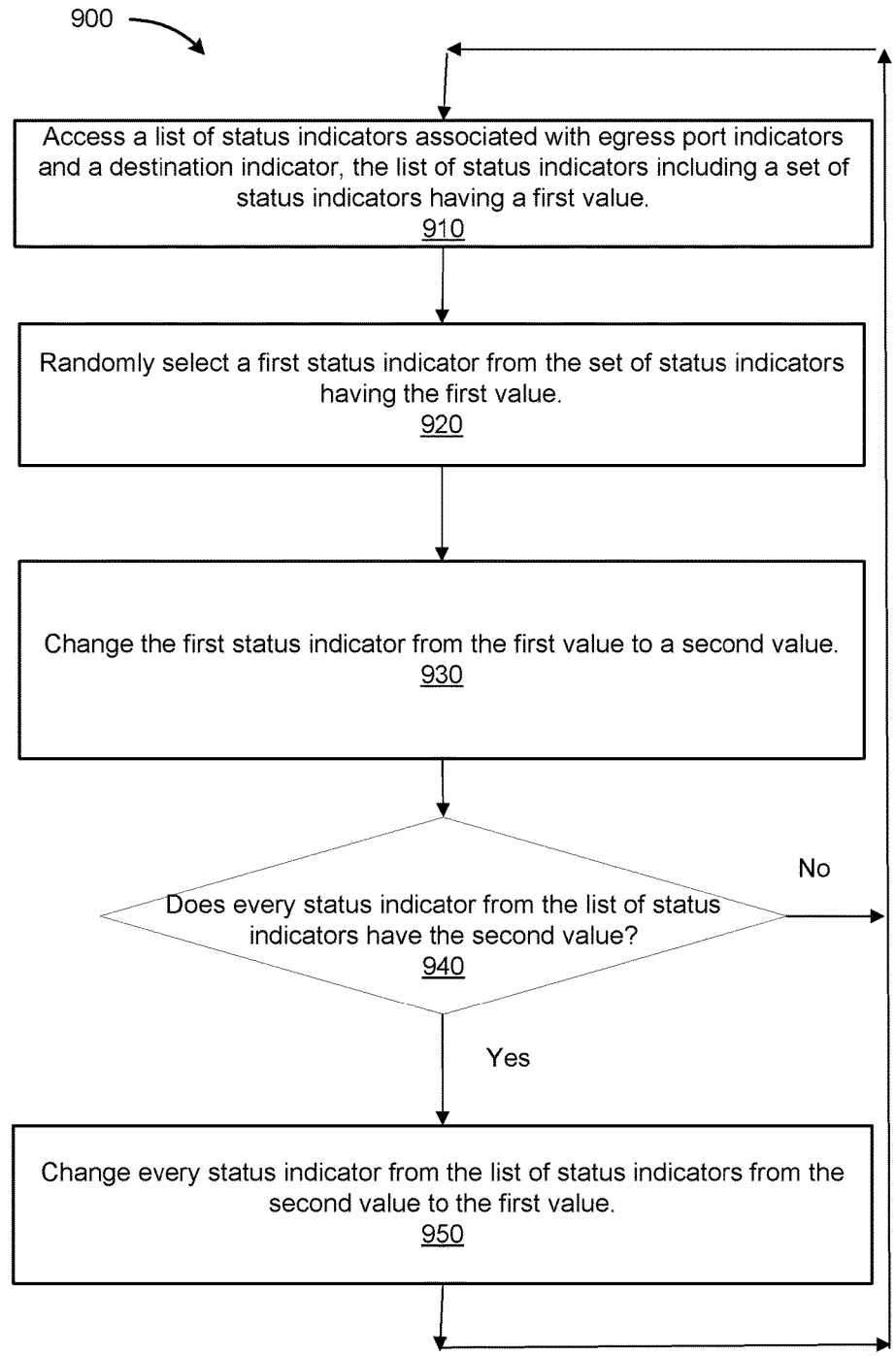
FIG. 9 is a flow chart that illustrates a method for selecting an egress port from a list of egress ports to send a data cell, according to an embodiment.

FIG. 9 is a flow chart that illustrates a method for selecting an egress port from a list of egress ports to send a data cell, according to an embodiment. At 910, a list of status indicators associated with egress port indicators and a destination indicator can be accessed, where the list of status indicators includes a set of status indicators having a first value. Specifically, after a data cell is received at a switch module, a schedule module operatively coupled to the switch module can be configured to access a status indicator list. Each status indicator from the status indicator list is associated with an egress port indicator, which uniquely identifies an egress port of the switch module. The status indictor list is associated with a destination indicator, which can be determined from a destination identifier retrieved from the data cell. Furthermore, each status indicator from the status indicator list has a value, which is used to indicate the availability of the egress port associated with the status indicator for sending a data cell. Particularly, a set of status indicators from the status indicator list have a first value, which indicates the egress ports associated with this set of status indicators are available for sending a data cell.

In the example of FIG. 4, after a data cell is received at a switch module, a destination identifier is retrieved from the data cell, and destination indicator 1 is determined to be associated with the data cell based on the destination identifier. Then, a schedule module operatively coupled to the switch module is configured to access status indicator list 521 having the value of "0|1|1| . . . |0" stored in the first entry of schedule table 500, based on destination indicator 1. Each status indicator from status indicator list 521 having the value of "0|1|1| . . . |0" is associated with an egress port indicator, and has a first value "1" or a second value "0". The egress ports associated with the set of status indicators having the first value "1" are indicated as being available for sending the data cell.

At 920, a first status indicator can be randomly selected from the set of status indicators having the first value. Specifically, the schedule module can be configured to randomly select a status indicator from the set of status indicators having the first value. In some embodiments, the random selection can be done in a way such that each status indicator from the set of status indicators is associated with an equal probability of being selected. In some other embodiments, a status indicator can be selected based on a credit value associated with each status indicator from the set of status indicators. Details on randomly selecting a status indicator from a set of status indicators are described above with respect to FIG. 4, and are therefore not elaborated herein. In the example of FIG. 4, the schedule module is configured to randomly select a status indicator from the set of status indicators having a value "1". For example, the second leftmost status indicator from status indicator list 521 having the value of "0|1|1| . . . |0" is selected by the schedule module.

At 930, the value of the first status indicator can be changed from the first value to a second value. Specifically, as a result of the status indicator being selected by the schedule module, the schedule module can be configured to change the value of the status indicator from the first value to the second value, which indicates an egress port associated with the status indicator is unavailable for sending a data cell. In the example of FIG. 4, as a result of the second leftmost status indicator from status indicator list 521 having the value of "0|1|1| . . . |0" being selected by the schedule module, the schedule module is configured to change the value of the second leftmost status indicator from the first value "1" to the second value "0". Thus, status indicator list 521 is changed from "0|1|1| . . . |0" to "0|0|1| . . . |0".

At 940, whether every status indicator from the list of status indicators has the second value can be determined. In the example of FIG. 4, after the selected status indicator is changed from the first value to the second value, the schedule module is configured to determine whether every status indicator from the list of status indicators has the second value. If not, at least one status indicator from the list of status indicators still has the first value and the schedule module is configured to repeat the procedures from 910 as shown in FIG. 9. That is, the schedule module is configured to select another status indicator from the set of status indicators having the first value, for sending the next received data cell. If every status indicator from the list of status indicators has the second value, the schedule module is configured to proceed to 950 as shown in FIG. 9.

At 950, when every status indicator from the list of status indicators has the second value, the value of every status indicator from the list of status indicators can be changed from the second value to the first value. Specifically, when every status indicator from the status indicator list has the second value as a result of that status indicator having been selected, the schedule module can be configured to change the value of every status indicator from the status indicator list from the second value to the first value. In the example of FIG. 4, when every status indicator from the status indicator list has the second value "0", the schedule module is configured to change the value of every status indicator to the first value "1". Thus, the status indicator list is changed from "0|0|0| . . . |0" to "1|1|1| |1".

After 950, every status indicator from the status indicator list has the first value, which indicates each of the egress ports associated with the status indicators is available for sending next data cell. When next data cell arrives the switch module, the same operations are repeated at the switch module starting from 910.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

While shown and described above with respect to FIG. 3 as schedule module 320 being included in switch module 300, in other embodiments, a schedule module can be operatively coupled to and/or in communication with a switch module. In some embodiments, a schedule module can be located on a separate device from the device on which a switch module is located, wherein the device hosting the schedule module is operatively coupled to the device hosting the switch module. Alternatively, a schedule module can be located on a separate device from the device on which a switch module is located, wherein the device hosting the schedule module is in communication with the device hosting the switch module. In such embodiments, the schedule module can be configured to select egress ports for sending data cells received at the switch module by sending signals (e.g., control signals, data signals) to and receiving signals from the switch module. For example, the schedule module can receive data from the switch module, containing a set of available status indicators and their associated credit values, based on which the schedule module can be configured to select a status indicator. For another example, the schedule module can send a signal to a processor of the switch module containing an egress port indicator associated with a selected status indicator, which is then used by the switch module to send a received data cell.

While shown and described above with respect to FIGS. 4-5 as a value of a status indicator or a credit value associated with an egress port being modified only when an egress port is selected, or, a status indicator list or a credit value list is restored to an initial state, in other embodiments, a value of a status indicator or a credit value associated with an egress port can also be modified under other circumstances. For example, when a failure or a malfunction is detected at an egress port of a switch module, the switch module can be configured to change the value of the status indicator associated with the failed egress port from a first value to a second value. As a result, the failed egress port is identified as being unavailable to send a data cell, and therefore will not be selected to send a data cell. For another example, when a traffic congestion or a long queue of data cells is detected at an egress port of a switch module, the switch module can be configured to reduce the credit value associated with the congested egress port, such that the updated credit value might be lower than the predetermined credit threshold. As a result, the congested egress port might be identified as not available for sending the next data cell.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and read-only memory (ROM) and RAM devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. An apparatus, comprising:
a memory, and
a processor operatively coupled to the memory,
the processor configured to randomly select a first egress port indicator from a first list of egress port indicators for a first cell from a plurality of cells, each egress port indicator from the first list of egress port indicators representing a status of an egress port of a switch, the first list of egress port indicators is uniquely associated with a first destination indicator for the first cell,
the first egress port indicator has a first value before the first egress port indicator is selected for the first cell,
the processor is configured to change the first egress port indicator from the first value to a second value after the first egress port indicator is selected for the first cell, the second value being different from the first value,
the processor configured to send the first egress port indicator such that the first cell is sent from an egress port associated with the first egress port indicator,
the processor configured to randomly select a second egress port indicator from a second list of egress port indicators for a second cell from the plurality of cells, each egress port indicator from the second list of egress port indicators representing a status of an egress port of the switch, the second set of cells being mutually exclusive from the first set of cells, the second list of egress port indicators is uniquely associated with a second destination indicator for the second cell, the second destination indicator for the second cell being different from the first destination indicator for the first cell,
the processor configured to send the second egress port indicator such that the second cell is sent from an egress port associated with the second egress port indicator.

2. The apparatus of claim 1, wherein:
the first list of egress port indicators corresponds to the second list of egress port indicators.

3. The apparatus of claim 1, wherein:
for each cell from the plurality of cells, the processor is configured to map (1) a destination indicator of that cell to a group indicator of that cell, and (2) the group indicator of that cell to a destination-related indicator of that cell.

4. The apparatus of claim 1, wherein:
the processor is configured to, for each remaining cell from the plurality of cells having the first destination-related indicator, (1) randomly select an egress port indicator from the first list of egress port indicators and having a first value, and (2) change that egress port indicator from the first value to a second value.

5. The apparatus of claim 1, wherein:
the processor is configured to, for each remaining cell from the plurality of cells having the first destination-related indicator, (1) randomly select an egress port indicator from the first list of egress port indicators and having a first value, and (2) change that egress port indicator from the first value to a second value,
when every egress port indicator from the first list of egress port indicators has the second value, the processor is configured to change for every egress port indicator from the first list of egress port indicators from the second value to the first value.

6. The apparatus of claim 1, wherein:
each egress port indicator associated with the first list of egress port indicators is associated with a credit value, the processor is configured to, for remaining each cell from the plurality of cells having the first destination-related indicator, (1) randomly select an egress port indicator from the first list of egress port indicators and having a first value, (2) reduce the credit value for that egress port indicator, and (3) change that egress port indicator from the first value to a second value when the credit value for that egress port indicator is below a threshold.

7. The apparatus of claim 1, wherein:
each egress port indicator from the first list of egress port indicators is associated with a credit value,
the processor is configured to, for each remaining cell from the plurality of cells having the first destination-related indicator, (1) increase the credit value for the egress port indicator of that cell above a threshold, and (2) change the egress port indicator from a first value to a second value when an egress port indicator from the first list of egress port indicators has been selected for every cell from the plurality of cells having the first destination-related indicator.

8. The apparatus of claim 1, wherein:
the processor is configured to receive the plurality of cells,
the processor is configured to send each cell from the plurality of cells via an egress port of the switch associated with the egress port indicator selected for that cell.

9. An apparatus, comprising:
a memory; and
a processor operatively coupled to the memory,
the processor configured to receive a plurality of sets of cells, each egress port indicator from a list of egress port indicators for a set of cells from the plurality of sets of cells is associated with a credit value,
the processor configured to, for each set of cells from the plurality of sets of cells, (1) randomly select an egress port indicator from the list of egress port indicators for that set of cells and that each having a first value, (2) reduce the credit value for that egress port indicator, and (3) change that egress port indicator from the first value to a second value when the credit value for that egress port indicator is below a threshold, that egress port indicator representing a status of an egress port of a switch until each egress port indicator from the list of egress port indicators for that set of cells has been selected,
the switch having a plurality of egress ports, and
the processor configured to send each set of cells from the plurality of sets of cells via an egress port from the plurality of egress ports based on the egress port indicator selected for that set of cells.

10. The apparatus of claim 9, wherein:
the processor is configured to map, for each cell from the plurality of sets of cells, a destination indicator of that cell to a group indicator of that cell,
the processor is configured to map, for each cell from the plurality of sets of cells, the group indicator of that cell to a destination-related indicator associated with a set of cells from the plurality of sets of cells, and
the plurality of sets of cells including a first set of cells having a first destination-related indicator, the first set of cells including a first cell and a second cell, the destination indicator of the first cell being different from the destination indicator of the second cell.

11. The apparatus of claim 9, wherein:
each egress port from the plurality of egress ports for the switch being uniquely associated with an egress port indicator from the list of egress port indicators.

12. The apparatus of claim 9, wherein:
the processor is configured to, for each set of cells from the plurality of sets of cells having a destination-related indicator, (1) increase the credit value for that egress port indicator associated with that set of cells above the threshold, and (2) change the egress port indicator from the first value to the second value when an egress port indicator from the list of egress port indicators has been selected for every cell from that set of cells from the plurality of sets of cells having the destination-related indicator.

13. A method, comprising:
receiving a plurality of sets of data cells, each data cell from the plurality of sets of data cells having a destination indicator from a plurality of destination indicators;
mapping, for each data cell from the plurality of sets of data cells, the destination indicator of that data cell to a group indicator of that data cell;
mapping, for each data cell from the plurality of sets of data cells, the group indicator of that data cell to a destination-related indicator of that data cell, each destination-related indicator associated with a set of data cells from the plurality of sets of data cells, each destination-related indicator uniquely associated with a list of egress port indicators, each egress port indicator from the list of egress port indicators representing a status of an egress port from a plurality of egress ports of a switch;
for each data cell from the set of data cells from the plurality of sets of data cells having the destination-related indicator,
randomly selecting an egress port indicator from the list of egress port indicators having a first value, and
changing that egress port indicator from the first value to a second value; and
sending, for each data cell from the set of data cells, the egress port indicator for that data cell causing that data cell to be sent via an egress port from the plurality of egress ports and associated with the egress port indicator for that data cell.

14. The method of claim 13, wherein:
each egress port indicator from the list of egress port indicators for a set of data cells from the plurality of sets of data cells is associated with a credit value,
for each set of data cells from the plurality of sets of data cells having the destination-related indicator,
reducing the credit value for that egress port indicator, and
the changing including changing that egress port indicator from the first value to the second value when the credit value for that egress port indicator is below a threshold.

15. The method of claim 13, wherein:
each egress port indicator from the list of egress port indicators for a set of data cells from the plurality of sets of data cells is associated with a credit value,
for each set of data cells from the plurality of sets of data cells having the destination-related indicator,
increasing the credit value for the egress port indicator associated that set of data cells above a threshold, and
the changing including changing that egress port indicator from the first value to the second value, when an egress port indicator from the list of egress port indicators has been selected for every data cell from that set of cells from the plurality of sets of data cells having the destination-related indicator.

16. The method of claim 13, wherein:

each egress port from the plurality of egress ports for the switch is uniquely associated with an egress port indicator from the list of egress port indicators.

* * * * *